United States Patent [19]

Lemeshewsky et al.

[11] 4,170,415

[45] Oct. 9, 1979

[54] SYSTEM FOR PRODUCING ORTHOPHOTOGRAPHS

[75] Inventors: George P. Lemeshewsky; Thomas O. Dando, both of Alexandria; Arthur R. Shope, Jr., Reston; Kenneth D. Kuck, Arlington, all of Va.

[73] Assignee: The United States of America as represented by the Secretary of the Interior, Washington, D.C.

[21] Appl. No.: 816,058

[22] Filed: Jul. 15, 1977

[51] Int. Cl.² .................................................. G03B 27/32
[52] U.S. Cl. .................................... 355/22; 355/77; 353/6
[58] Field of Search ................. 355/22, 77; 353/6, 7; 356/2, 6; 33/20 D; 346/29, 33 MC; 364/200 MS File, 900 MS File, 518, 520

[56] References Cited

U.S. PATENT DOCUMENTS

| | | | |
|---|---|---|---|
| 3,199,111 | 8/1965 | Jennings et al. | 346/29 |
| 3,694,072 | 9/1972 | Danko, Jr. et al. | 355/22 |
| 3,904,816 | 9/1975 | Taudt et al. | 358/256 |
| 3,915,569 | 10/1975 | Polzleitner | 355/22 X |
| 3,924,244 | 12/1975 | Seitz | 364/900 |

*Primary Examiner*—L. T. Hix
*Assistant Examiner*—W. J. Brady
*Attorney, Agent, or Firm*—Gersten Sadowsky; Donald A. Gardiner

[57] ABSTRACT

In an orthophotograph recorder, a three dimensional optical model of a terrain produced by a stereo pair of aerial transparencies is projected onto an imaging plate. The optical model is scanned by an optically produced reference point while the height of the viewing plate is manually adjusted by the operator to maintain the reference on the apparent ground level of the terrain. The scanning motion of the reference point, as well as the height of the imaging plate, is digitally encoded and formatted into data blocks. Each block of digital data represents an individual scan line on the optical model, and is characterized by a starting coordinate and incremental coordinate data. This data format minimizes storage requirements and permits editing of individual scan lines. The encoded data are scaled and stored on magnetic tape to be used to control exposure of a photosensitive sheet in an orthophotograph printer. The printer comprises a light projector located above a platen carrying the photosensitive sheet. A transparency corresponding to the optical model is located between the projector and platen. Adjacent the photosensitive sheet, there is a screen containing an aperture which is moved parallel to the platen to expose the photosensitive sheet to the projected optical model in scanning fashion. During scanning, the height of the platen is adjusted in accordance with the stored digital data so that the sheet portion being exposed is always kept in intersection with the apparent ground plane of the optical model.

10 Claims, 25 Drawing Figures

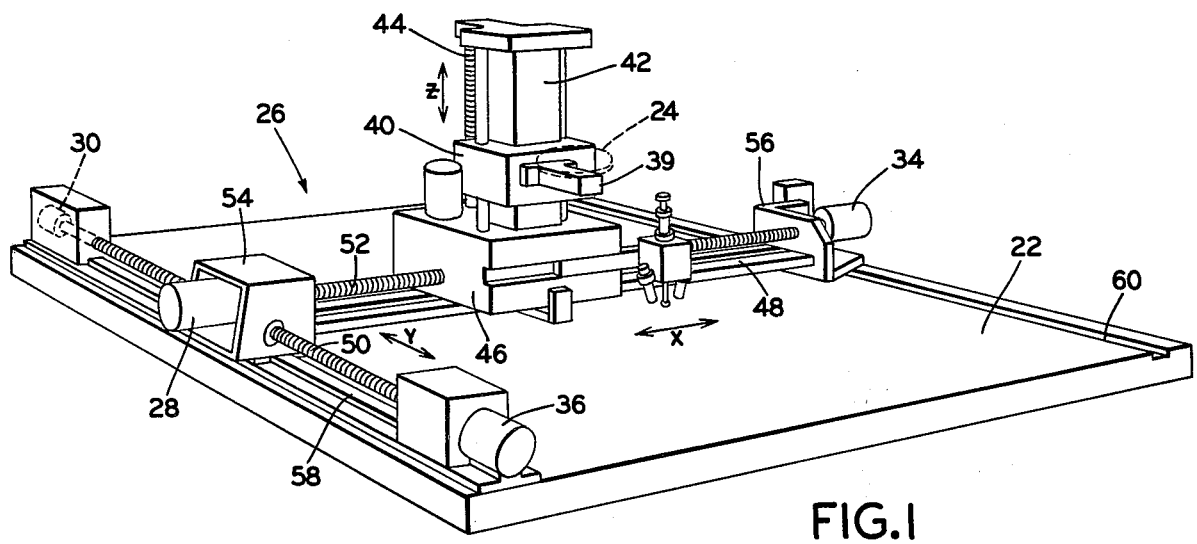
FIG.1
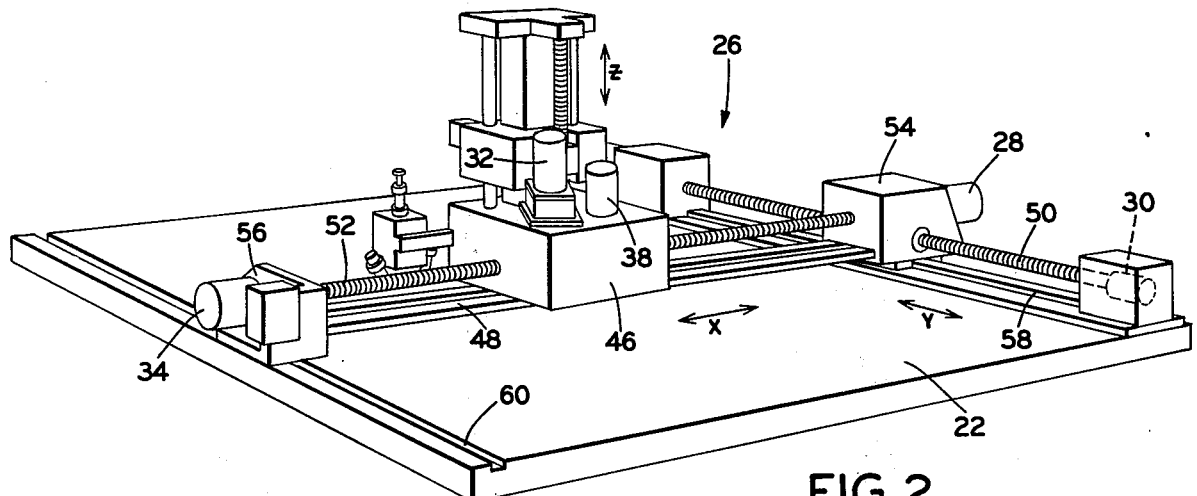
FIG.2
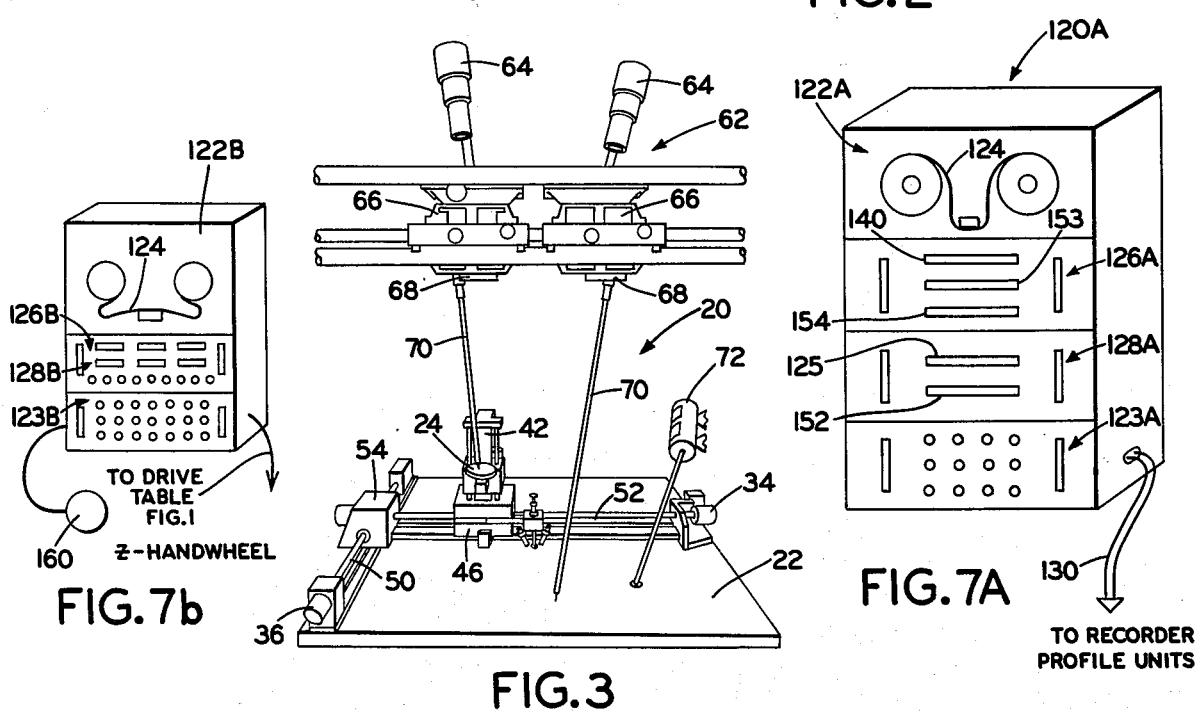
FIG.7b
FIG.3
FIG.7A

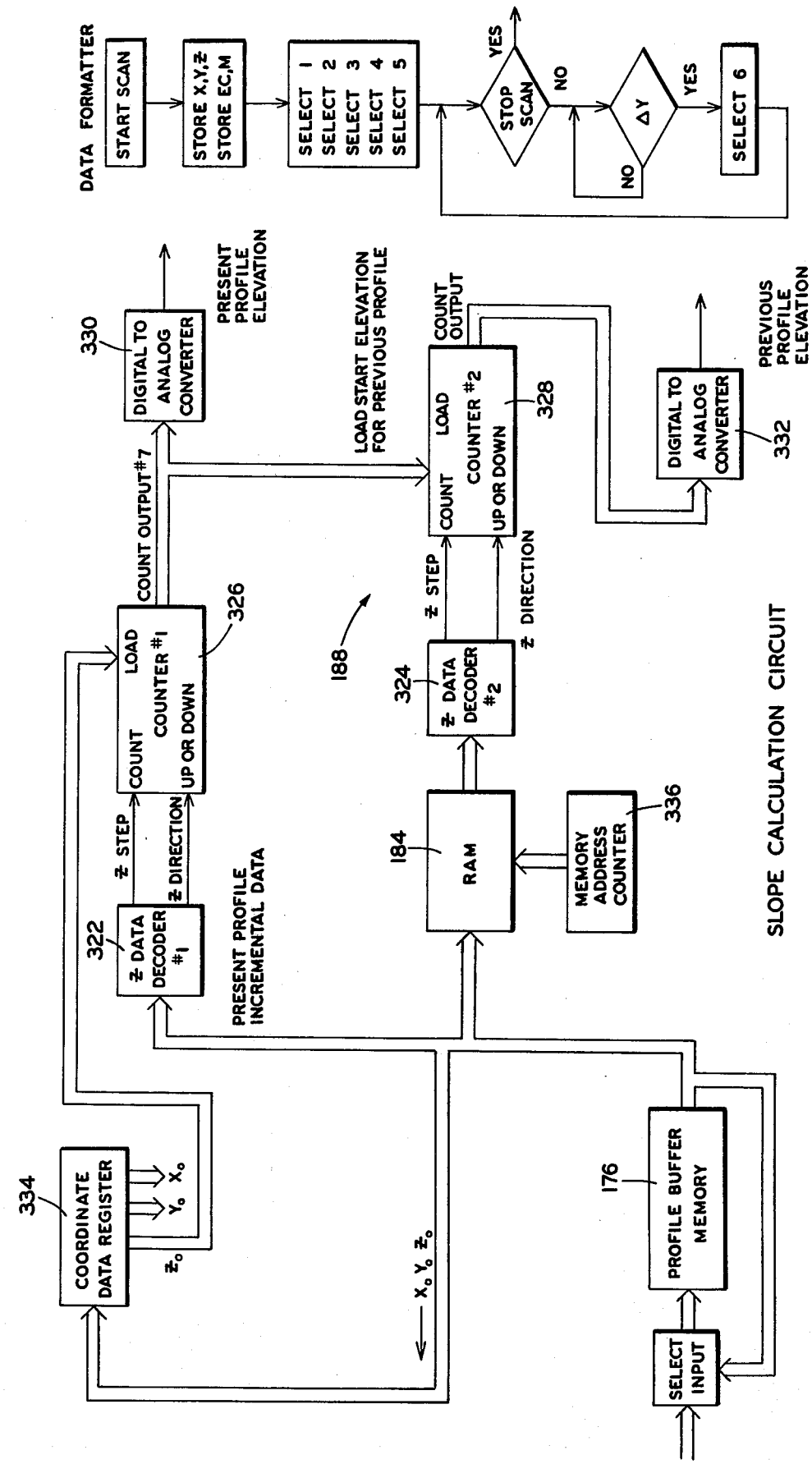

PROFILE DATA DECODER

PRINTER CONTROL SEQUENCER

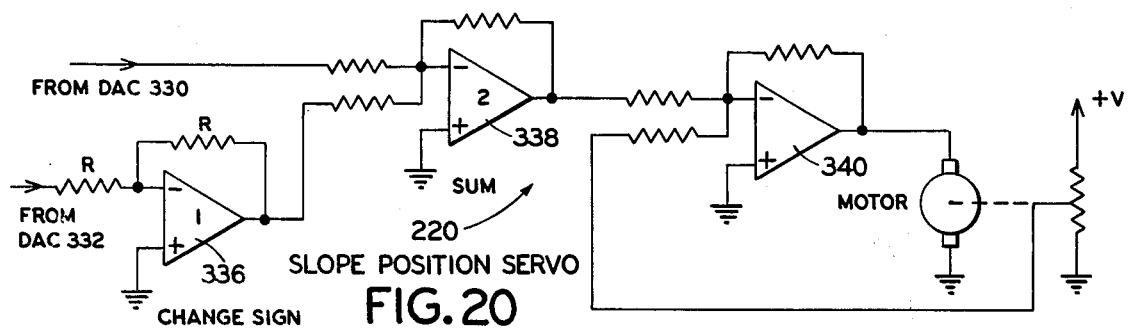
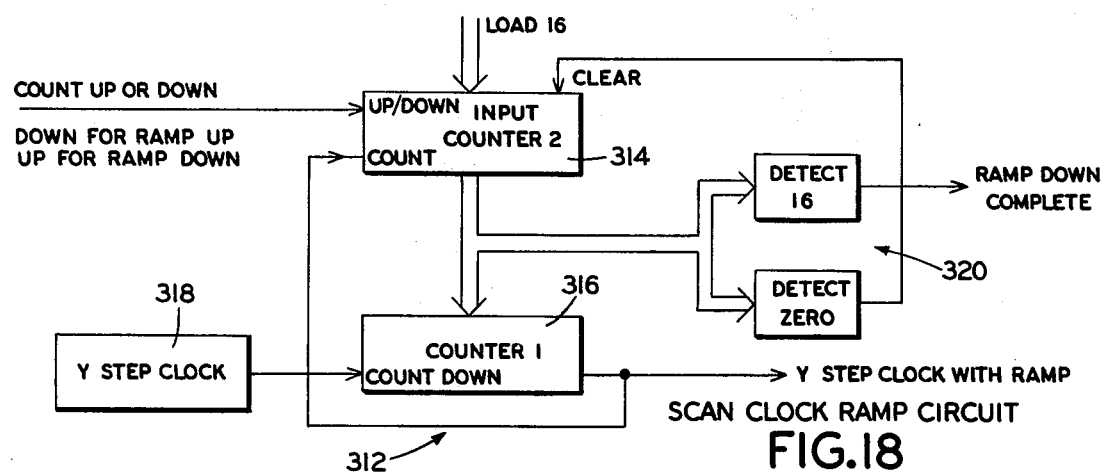
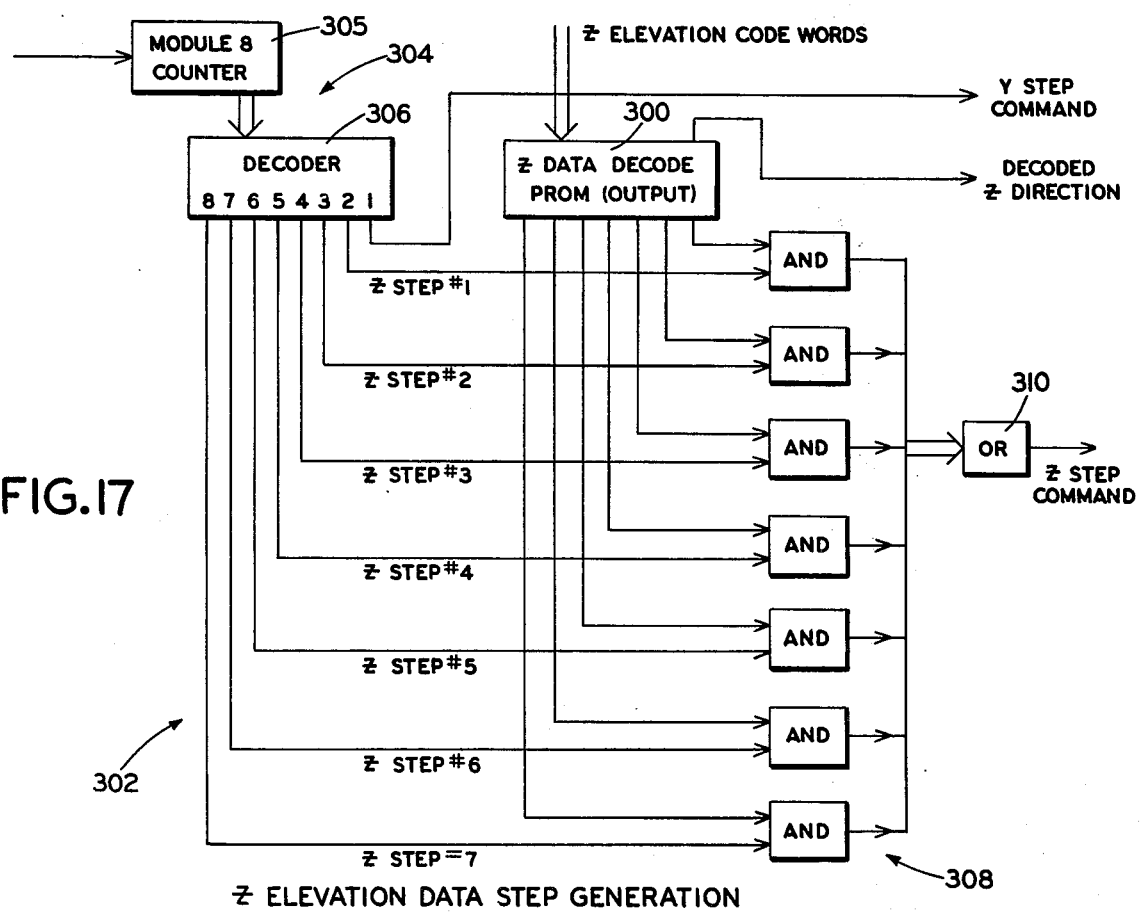

SYSTEM FOR PRODUCING ORTHOPHOTOGRAPHS

BACKGROUND OF THE INVENTION

The present invention relates generally to production of distortion-free photographic maps, known as orthophotographs, which are orthogonal projections of the ground on a horizontal plane. The invention relates more particularly toward instrumentation for producing orthophotographs by generating digital profile information from a stereoscopic model, storing the digital information on magnetic tape, and using the information in an offline mode to control the drive systems of an orthophotograph printer.

An orthophotograph, as known in the prior art, is a photographic map of a terrain with every detail ideally represented in its true horizontal position with any distortion caused by camera parallax and terrain relief corrected. The basic procedure for producing an orthophotograph involves creating a pair of aerial photographs of a terrain taken at different angles to formulate a three dimensional, optical model of the terrain. The two photographs (transparencies) are respectively placed in each of two projectors and are projected to create the three dimensional optical model by viewing the superimposed images through appropriate light filters or an image alternator. A photosensitive sheet is exposed to one of the transparencies through an aperture that scans the sheet, exposing only a small portion at a time. As the sheet is scanned, the height of the photosensitive sheet is adjusted by the operator so that the portion of the sheet being exposed is always kept on the apparent ground plane of the optical model.

Apparatus for exposing the photosensitive sheet so as to produce an orthophoto negative in the above described manner is disclosed in U.S. Pat. No. 2,869,419 to Bean, assigned to the assignee of the present invention.

While generally satisfactory, the above described system requires constant attention by the operator to maintain contact between the exposure aperture and the apparent terrain surface of the stereo model as the aperture scans across the model at constant speed. This type of system produces extreme operator fatigue with no provisions for correcting operator error. In addition, the system produces only single orthophoto negatives and is not adaptable for larger scale production or for editing.

Another type of system for producing orthophoto negatives, such as Stereomat, manufactured by Raytheon Autometics, includes image correlation devices that utilize a cathode ray tube to automatically correlate conjugate imagery and expose it on film in orthophotographic form. Such systems have high cost, and there is a likelihood of correlating unwanted images, such as treetops, which are not on the ground datum.

In another approach, incorporated in an apparatus known as the Gigas-Zeiss, manufactured by Zeiss Division of Keuffel & Esser, line-drawn profiles are obtained mutually by scanning a stereo model and then by electronic following techniques. These profiles are scanned to create output signals that are used to control drive motors in an automated exposure instrument. This type of instrumentation is expensive, and lacks versatility since it cannot be adapted to accomodate the wide variety of photomap products currently demanded.

Finally, semiautomated digital systems are presently available, wherein terrain data are generated in the same manner as the line-following technique, described above, except that the output is a digital record rather than a series of profile line drawings. The output data can be in the form of punched paper tape, magnetic tape or any other digital storage medium. Such a system is the K-320 manufactured by the Danko Arlington Company. While this type of system is more versatile than the systems described above, the equipment is extremely complex, and therefore quite costly, and requires the purchase of dedicated stereo plotters and orthophoto instruments.

There still exists a need for instrumentation that can be used in connection with a variety of different stereo plotters and orthophoto exposure instrumentation, and which can be adapted to accomodate various orthophoto applications, as required.

Accordingly, one object of the invention is to provide a new and improved system for producing orthophotographs.

Another object of the invention is to provide a new and improved system for producing orthophotographs useable with any of a variety of non-dedicated stereo plotters and orthophoto exposure instruments.

Another object is to provide a new and improved system for producing orthophotographs, wherein digital profile data are generated by a stereo plotter during scanning of a stereo model, which data are subsequently used to control an orthoprinter.

Yet another object is to provide a new and improved system for producing orthophotographs, wherein digital profile data are generated by a stereo plotter during scanning of a stereo model, and the digital data are scaled and stored in a memory to be subsequently used to control the drive members of an orthophoto exposure instrument.

Still another object is to provide a new and improved system for producing orthophotographs, including a control apparatus interfacing a stereo plotter and orthophoto exposure instrument, wherein the digital profile for each line scan of a stereo model generated by the plotter is stored on a magnetic tape as a single block of information for subsequent use in controlling an orthophoto exposure instrument.

Still another object is to provide a new and improved system for producing orthophotographs, wherein profile data for each line scan of a stereo model made by a stereo plotter are digitally encoded and stored on magnetic tape for subsequent use in controlling an orthophoto exposure instrument, wherein information associated with each line scan may be modified or edited as required, without affecting the remainder of the orthophotograph.

Another object of the invention is to provide a new and improved system for producing orthophotographs, wherein each line scan of a stereo model made by a stereo plotter is digitally encoded and stored on a magnetic tape as a starting coordinate and a series of incremental coordinate data to be used for controlling the drive members of an orthophoto exposure instrument.

Yet another object is to provide a new and improved system for producing orthophotographs, wherein terrain slope is continuously monitored during scanning of a stereo model, and the operator is alerted on occurrence of excessive slopes that may arise as a result of operator error or in any event would exceed system capabilities, and wherein slope correction signals are developed during playback to be supplied to conventional slope correction optics.

BRIEF DESCRIPTION OF THE INVENTION

Briefly, in accordance with the invention, there is provided a digital control system which interfaces a stereo plotter and an orthophotograph exposure instrument, or orthoprinter, for automated production of orthophotographs. The stereo plotter is equipped with rotary shaft encoders which generate digital signals representing (X,Y,Z) coordinate movement of an optical reference point during scanning of a stereo model of a terrain. The digital coordinate data are scaled and stored on magnetic tape in the digital interface to control (X,Y,Z) drive members in the orthoprinter. The stored data can be used to produce improved quality orthophotographs in an off-line mode, and in addition, can be used to generate a permanent digital record of terrain profiles suitable for production of contour, slope and aspect maps. Furthermore, the stored data can be edited in connection with new photography to produce suitably modified orthophotographs.

The stereo plotter is of a type such as the Kelsh Stereo Plotter, having a pair of projectors adapted to project a pair of stereoscopically related transparencies onto an imaging plate so as to form a stereoscopic image which is a stereo model of a terrain. A reference point is also projected onto the imaging plate by conventional optics. Servomechanisms cause the reference point to automatically scan the imaging plate in the X and Y directions parallel to the plate. An additional servomechanism is manually controlled by the operator to adjust the height of the plate in the Z direction so as to maintain the reference point on an apparent ground surface on the model during scanning. The rotary shaft encoders are coupled to the shaft of the X,Y,Z servomechanisms and generate digital data indicative of instantaneous (X,Y,Z) position of the reference point on the optical model.

As the optical reference point is automatically caused by the control to scan the imaging surface coordinates (X,Y) of the optical model, the operator manually adjusts the height of the imaging plate to maintain the Z-coordinate reference on the apparent ground plane of the optical model of the terrain. X and Y coordinate data representing the position of the optical reference point on a horizontal plane are digitally encoded by the X and Y rotary shaft encoders and supplied to the control. Also supplied to the control are corresponding Z coordinate data indicating the height of the optical reference point required to maintain the reference on the apparent ground plane of the model.

Scanning of the optical model is made alternately in opposite directions on the Y-axis with line indexing being made on the X-axis. The coordinate data for each line scan made in the Y direction are stored as a data block on magnetic tape including starting coordinate data, successive incremental data represeting change of elevation during each line scan and line identification data. Since the data are stored in data blocks corresponding respectively to line scans, each block defined only by a starting coordinate, errors that might occur during scanning to provide exposure of an orthonegative are not cumulative from line to line. This is because each new line scan is initiated at the pre-recorded starting coordinate independent of the contents of the incremental data. Furthermore, since each line scan is stored as a single block of data, the scan lines can be later modified to correct errors or to add new data and successive scan lines can be "patched" to form a composite orthophotograph.

During scanning of the optical model on the imaging plate of the plotter, the coordinate data for each line scan are stored in a buffer memory. At the end of each scan, the operator either clears the buffer memory and repeats the scan profile, or records the profile on magnetic tape. This selective procedure is possible because, as aforementioned, the line scan data are stored on magnetic tape as individual blocks on a line by line basis.

During each line scan, terrain slope in the Y-direction (Y/Z slope) is continuously measured. If any of the Y/Z slope measurements exceed a predetermined value, a flag signal is generated. After generation of a preselected number of flag signals, the operator is alerted so that corrective action, such as rescanning the line, or profile, can be undertaken.

The coordinate data being stored on magnetic tape are scaled so as to be compatible with the orthophotograph printer which is of a type such as the Zeiss Model GZ1 Ortho Printer comprising a light projector located above a platen carrying a photosensitive sheet. A transparency mount for supporting a transparency corresponding to the stereoscopic image is positioned between the projector and platen. Located adjacent the platen is a screen having an aperture or slit formed therein. The aperture is moved in the X- and Y- directions parallel to the platen for scanning the photosensitive sheet. As scanning takes place, portions of the photosensitive sheet are successively exposed to the transparency image. The height of the platen during scanning is automatically adjusted in response to the digital data stored in the control whereby the photosensitive sheet is maintained on the ground plane of the optical image at all times during scanning to eliminate distortions caused by camera parallax and terrain relief.

During reproduction of profiles, slope in the X- direction (X/Z slope), that is, slope of terrain between adjacent profiles, is measured as follows. As the profile or coordinate data are being read out from a profile data buffer in the control, the elevation at each Y-coordinate on the profile is compared to the elevation at a corresponding Y-coordinate on the immediately preceeding profile to obtain an elevation differential from which the X/Z slope is calculated. Slope correction signals are generated to control conventional slope correction optics.

Other objects, advantages and features of the present invention will become readily apparent to those skilled in this art from the following detailed description wherein we have shown and described only the preferred embodiment of the invention simply by way of illustration of the best mode contemplated by us of carrying out our invention. It is to be understood that the invention is capable of use in other and different embodiments, and its several details are capable of modification in various obvious respects, all without departing from the invention. Accordingly, the drawings and description are to be regarded as illustrative in nature, and not as restrictive.

BRIEF DESCRIPTION OF THE DRAWINGS

FIG. 1 is a perspective view of the (X,Y,Z) drive table of a conventional optical model profile recorder having incorporated therein X,Y,Z drive servomechanisms, as well as rotary shaft encoders, in accordance with the present invention;

FIG. 2 is a perspective view of the drive table shown in FIG. 1 along a different viewing angle to expose certain details thereof;

FIG. 3 is a perspective view of the drive table shown in FIG. 1 including a transparency projection system constituting the optical model profile printer;

FIG. 7a is a perspective view of a control console for the profile printer in accordance with the present invention;

FIG. 7b is a perspective view of a control console for the profile recorder, in accordance with the invention;

FIG. 8b is a symbolic illustration of a data block corresponding to one profile;

FIG. 9 is a block diagram of a digital control system contained within the console shown in FIG. 7b for controlling the operation of the profile printer in response to the digital data recorded by the system shown in FIG. 8a;

FIG. 10 is a block diagram of a Y-axis scan length detector circuit, used in the system shown in FIG. 8a;

FIG. 11 is a circuit diagram of a Y-axis motor control corresponding to block 152 in FIG. 8a;

FIG. 12 is a circuit diagram of a Z-axis motor control corresponding to block 158 in FIG. 8a;

FIG. 13 is a diagram of a profile sequence controller corresponding to block 134 in FIG. 8a;

FIG. 14a is a circuit diagram of profile data formatter 133, shown in FIG. 8a;

FIG. 14b is a signal flow diagram corresponding to the circuit shown in FIG. 14a;

FIG. 15b is a signal flow diagram corresponding to the circuit shown in FIG. 15a;

FIG. 17 is a circuit diagram of a Z-elevation data step generator, used in the system shown in FIG. 9;

FIG. 18 is a scan clock ramp circuit used for controlling Y-axis drive 96 in FIG. 9;

FIG. 19a is a circuit diagram of a slope calculation circuit corresponding to block 188 in FIG. 9;

FIG. 19b is a signal flow diagram corresponding to the circuit of FIG. 19a; and

FIG. 20 is a circuit diagram of a slope correction amplifier, corresponding to block 202 in FIG. 9.

DETAILED DESCRIPTION OF THE PREFERRED EMBODIMENT

RECORDER 20; GENERAL

Figure 4:
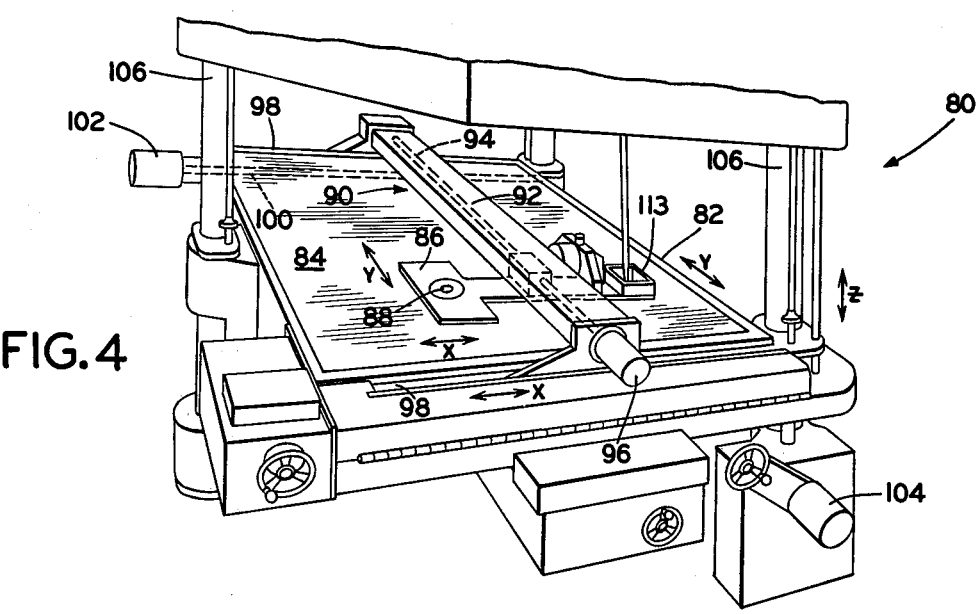
FIG. 4 is a perspective view of a portion of a conventional orthophotograph printer having incorporated therein drive servomechanisms, together with digital encoders, in accordance with the present invention.

Referring now to the Figures, and initially to FIGS. 1–3 thereof, there is illustrated an optical model projector and profile recorder system, identified herein as "recorder" in accordance with the present invention. The recorder 20 (see FIG. 3) is a conventional unit of a type such as the Kelsh Stereo Plotter and Manual Profiler having a table 22 onto which is mounted an imaging plate 24 movably supported on a set of (X,Y,Z) drive members identified generally by 26 (FIGS. 1 and 2). In accordance with one aspect of the invention, the set of drive members 26 is equipped with servomechanisms or motors 28, 30 and 32 for operating the drive members 26, respectively in the X,Y and Z directions, as well as (X,Y,Z) encoders 34, 36 and 38, respectively, for digitally encoding the axial positions of imaging plate 24.

Since profile recorder 20 is conventional, details of the standard elements thereof shall not be described herein for the sake of brevity. However, as an overview of recorder 20, the set of drive members 26 comprises a platform 39 onto which the imaging plate 24 is mounted, the platform being secured to a block 40 which, in turn, is movably mounted to a tower 42 defining a Z-axis. The block 40 is controlled in the Z-direction by a Z-drive screw 44 rotated by the Z-drive motor 32 through standard coupling means, not shown. The Z-coordinate position of the imaging plate 24 and platform 39 is continuously monitored by rotary shaft digital encoder 38, coupled to the motor 32 within block 46 by standard coupling means, not shown.

The block 46 is mounted so as to be movable in the Y-direction along tracks 58 and 60, and is driven by Y-drive screw 50 rotated by the Y-motor 30. The Y-coordinate position of the imaging plate 24 on platform 39 is continuously monitored by the digital rotary shaft encoder 36. The block 46 is also movable in the X-coordinate direction by an X-drive screw 52 which is rotated by the X-servo motor 28, the X-coordinate position of the imaging plate 24 being continuously monitored by digital encoder 34. During rotation of X-coordinate drive screw 52, support members 54 and 56 at opposite ends of the screw 52 are guided along the tracks 58 and 60 formed in table 22 so as to be maintained orthogonal to the Y-screw 50.

It can thus be appreciated that imaging plate 24 is locatable in any (X,Y,Z) coordinate on table 22 by the motors 28, 30 and 32, and the (X,Y,Z) coordinate position of the imaging plate is continuously monitored by the rotary shaft, digital encoders 34, 36 and 38, respectively.

Referring to FIG. 3, mounted above the table 22 is a transparency projector system indicated by 62, used in connection with the conventional profile recorder 20 for projecting a stereo optical model of terrain from a stereo pair of photographic transparencies onto the imaging plate 24. The projector system 62 is conventional and therefore is not described in detail herein. However, the system 62 generally comprises a pair of light beam projectors 64,64 for projecting light beams through transparency supports 66,66 and suitable optics 68,68 for directing and focusing the stereo images on the imaging plate 24. The stereo images from the transparencies located in supports 66,66 are superimposed on the plate 24 by manually adjusting control arms 70,70 so as to properly orient the optics 68,68.

A viewer 72 is mounted to recorder 20 so as to permit the operator to view the model projected onto imaging plate 24. The viewer 72, which is also conventional, synchronizes the two eyes of the operator to the stereoscopically related images projected by optics 68,68. Preferably, synchronization of the viewer 72 to optics 68,68 is made by a standard image alternator, which alternately emits light into the two eyes of the operator in synchronization to a shutter means located in optics 68,68. Alternatively, viewer 72 may contain light filters which correspond to filters in the optics 68,68 so as to direct images produced by stereoscopically related transparencies in members 68,68 respectively to the two eyes of the operator. In either case, the operator perceives a three-dimensional optical model of terrain on viewing plate 24 onto which the image projected by optics 68,68 is superimposed.

Additional optics (not shown) are provided in a conventional manner within the viewer 72 to give the operator an appearance of an optical reference point on the imaging plate 24 when viewed through viewer 72. The reference point is perceived by the operator as being located adjacent to or on the plate 24 at a particular Z-coordinate. In order to change the elevation of the reference point relative to the imaging plate 24, the height of the plate 24 is manually adjusted by the operator. For example, by manually adjusting the height of the imaging plate 24 on platform 39 so as to maintain the reference point on the ground plane of the stereo model of the terrain during scanning, the operator continuously adjusts the height of the plate 24 by controlling motor 28 using a Z-position control handwheel (FIG. 7b) or other manual control device.

As shall be described in detail below, the stereo model projected onto imaging plate 24 is scanned by the operator viewing the plate through viewer 72. The image is scanned by the optical reference point with the reference (1) traversing the image in the (+)Y direction defining a scan line, (2) indexing the image in the X-direction and then (3) traversing the image in the (−)Y direction defining another scan line. This process is repeated until the entire surface has been scanned. During scanning, the height of the imaging plate 24 is continuously varied by the operator to maintain the optical reference point on the ground plane of the stereo model. The height of the plate 24 as a function of Y-coordinate position for each scan line is monitored by the Z-encoder 38 and is defined herein as "profile". In accordance with the invention, a profile for each scan line of the stereo model is encoded as a single data block on magnetic tape. The stored data being stored are scaled so as to be compatible with an orthoprinter used for exposing the orthonegative, as discussed below, and are supplied to (X,Y,Z) motors controlling the orthoprinter.

PRINTER 80; GENERAL

Figure 5:
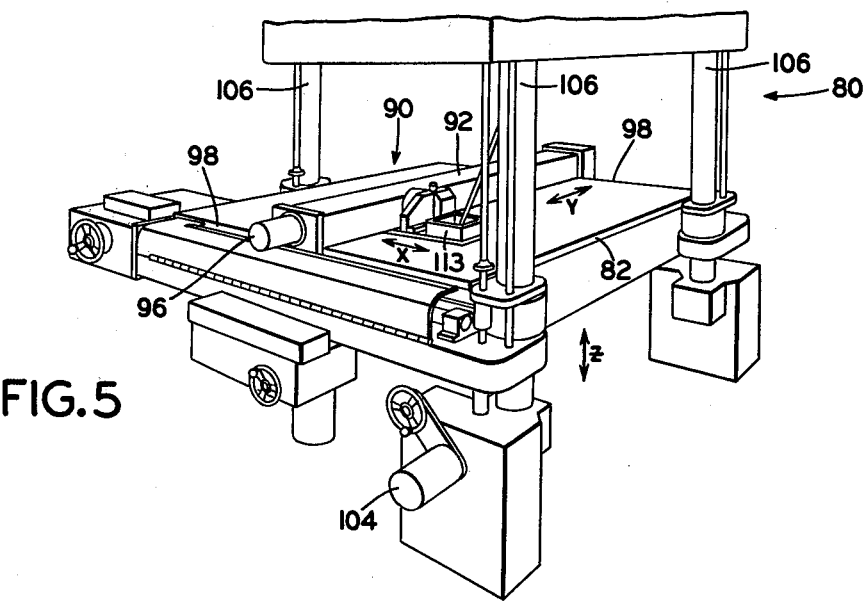
FIG. 5 is a perspective view of a portion of the orthophotograph printer shown in FIG. 4 along a different viewing angle to expose certain details thereof.
Figure 6:
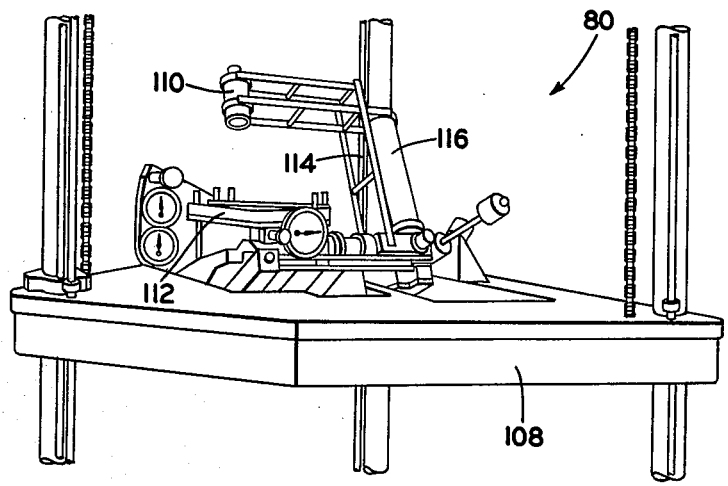
FIG. 6 is a perspective view of another portion of the orthophotograph printer including the light projector and transparency mount located above the X,Y,Z drive members.

Referring now to FIGS. 4-6, there is illustrated a conventional orthophotographic printer modified in accordance with the invention and identified at 80. Printer 80 comprises a platen 82 onto which is mounted a photosensitive sheet 84. Above the sheet 84 on platen 82 is located a screen 86 having formed therein aperture 88. The screen 86 is movable above the photosensitive sheet 84 by means of an X-Y drive mechanism 90. The X-Y drive mechanism 90 comprises a Y-rail 92 below which is movably driven the screen 86 by a Y-drive screw 94 rotated by a Y-drive servo or motor 96. A rotary shaft Y-encoder (not shown) mounted on drive screw 94 incorporated within motor 96 monitors the Y-coordinate position of the screen 86 and exposure aperture 88.

The Y-rail 92 itself is movable in the X-direction along guide channels 98 formed in the platen by means of an X-drive screw 100 rotated by X-drive motor 102. A rotary shaft encoder (not shown) incorporated in motor 102 is also coupled to the X-screw 100 so as to control operation of the X-drive motor in response to data originally generated by X-encoder 34 of the profile recorder 20 shown in FIG. 1.

It can thus be seen that the screen 86 and exposure aperture 88 can be positioned over photosensitive sheet 84 mounted on platen 82 at any (X,Y) coordinate by motors 96 and 102 in response to position data originally generated by the stereo recorder encoders 34 and 36. The motors 96 and 102 operate in an off-line mode in response to data recorded on magnetic tape, as described in detail below.

The height of platen 82 is controlled by a Z-motor 104 coupled to the platen 82 through suitable coupling (not shown). The height of platen 82 coupled to columns 106, as best seen in FIG. 5, is determined by a Z-encoder (not shown) incorporated within the Z-motor 104 and coupled to the platen. The Z-encoder causes Z-motor 104 to be responsive to Z-coordinate position data generated by Z-encoder 38 of the recorder 20 and recorded on magnetic tape to control the platen height.

Referring to FIG. 6, above platen 82 there is located a horizontal platform 108 supporting a light projector 100 positioned so as to project light through a transparency (not shown) located on a transparency mount 112 below the projector. The projector 110 is automatically adjusted by motors 96, 102, 104 so as to cause a beam of light to be projected from projector 110 through the transparency and onto the photosensitive sheet 84 (FIG. 4) through aperture 88 formed in screen 86.

The light projector 110 is made to track with the exposure aperture 88 so that portions of the transparency located on mount 112 are successively irradiated with light as corresponding portions of the sheet 84 are scanned by the exposure aperture. Mechanical coupling between the projector 110 and aperture 88 is provided by rod 114 (FIG. 6) extending downwardly from the projector into a cup 113 (FIG. 5) mounted at one end of the screen 86. The light projector 110 is pivotally mounted on support member 116 whereby the projector is pivoted to expose the sheet 84 only through aperture 88 in screen 86.

During an exposure of sheet 84 in the formation of an orthophotographic negative, the sheet is scanned by aperture 88 back and forth in the Y-direction. Each time aperture 88 traverses the sheet 84 to complete a line scan, the aperture is driven in the X-direction to ready the exposure aperture 88 for another line scan in the opposite Y-direction. The process is repeated until the entire sheet 84 is exposed to the transparency through aperture 88 in zig-zag fashion.

As the sheet 84 is scanned by exposure aperture 88, the height of platen 82 is continuously adjusted by the Z-motor 104 in response to the profile data on magnetic tape generated by recorder 20, shown in FIGS. 1-3. Sheet 84 is thus exposed to the transparency image with the sheet spaced from the image by a distance sufficient to maintain the optical reference point, discussed above in connection with recorder 20, on the ground plane of the optical model of the photographed terrain. Adjusting the height of the platen 82 so as to maintain a constant ground plane during exposure eliminates distortions caused by terrain relief and the physical displacement of the aerial cameras.

RECORDER AND PRINTER CONTROL CONSOLES

Referring to FIGS. 7a and 7b, consoles 120A and 120B, respectively, containing digital control and interface circuitry for controlling the operations of profile recorder 20 (FIGS. 1–3) and orthophotographic printer 80 (FIGS. 4–6) are shown. Recorder console 120A includes a tape unit 122A for a magnetic tape 124 and a hard wired logic controller 123A programmed so as to control the recorder 20 in a manner described herein. Also contained in console 120A are display units 126A and 128A for displaying line scan identification data. Hard wired logic controller 123A and displays 126A and 128A are seated in the console 120A on racks that may be removed for servicing or interchange. The console 120A interfaces the profile recorder 20 through wiring harness 130.

Printer console 120B contains a tape unit 122B for the magnetic tape unit 124 as well as display units 126B and 128B. Also included in console 120B is a hard wired logic controller 123B for controlling operation of printer 80 in response to the output of tape unit 122B. All units are mounted in console 120B on racks, and are removable.

As shall be described in detail below, console 120A receives input signals generated by the X-axis encoder 34, Y-axis encoder 36 and Z-axis encoder 38 of profile recorder 20 to be recorded on magnetic tape 124. The outputs of the X-axis encoder 34 and Y-axis encoder 36 are digital signals indicative of the position of scanning aperture 88 in an X,Y plane, controlled by the console 120A in an automatic scan mode. The output of Z-encoder 38 is a digital signal indicative of the elevation of the aperture 88 to maintain it on ground plane during scanning, manually controlled by the operator via Z-position central handwheel 160. The digital signals representing the X,Y and Z-coordinate data associated with the instantaneous positions of the aperture 88 during scanning are magnitude scaled and formatted into data blocks representing, respectively, individual profiles, or scan lines. During scanning, Y/Z slope is continuously monitored, and the operator is alerted if the slope is excessive, that is, beyond the data handling capacity of the circuitry more than a predetermined number of times. The data blocks which include a starting coordinate, incremental elevation data and error check data, are recorded onto magnetic tape which is used in connection with console 120B to control profile printing.

Profile printer console 120B reproduces the recorded data on a magnetic tape playback unit and stores the profile data blocks, one by one, in a buffer. Circuitry in the console 120B then separates the profile blocks into starting coordinate, incremental elevation data and other data. During read out of the data blocks from the buffer, X/Z slope at the corresponding points of successive profiles is calculated, slope correction signals being supplied to a slope correction device.

PROFILE RECORDER CONTROL

Figure 8A:
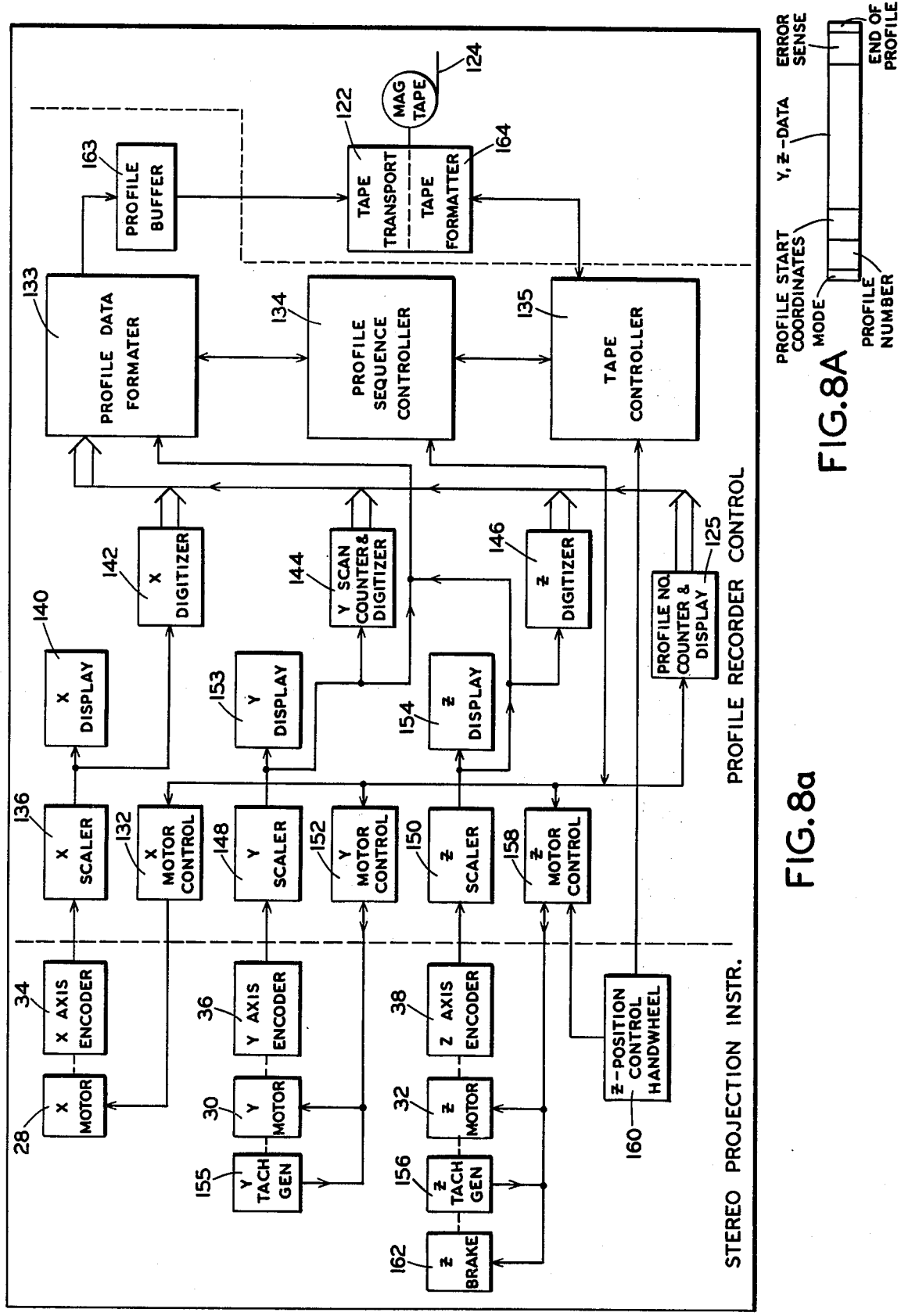
FIG. 8a is a block diagram of a digital control system contained within the console shown in FIG. 7a, in accordance with the invention, for controlling the operation of the profile recorder and processing and storing digital data generated therefrom.

Referring to FIG. 8a, X-motor or servo 28 is coupled to X-axis encoder 34. Similarly, Y-motor 30 is coupled to Y-axis encoder 36 and Z-motor 32 is coupled to Z-axis encoder 38. The X and Z motors 28 and 32 are conventional stepper motors, e.g., 200 steps per revolution types, Y-motor 36 being a D.C. motor.

The outputs of X-axis encoder 34, Y-axis encoder 36 and Z-axis encoder 38 are supplied, respectively, to X-scaler 136, Y-scaler 148 and Z-scaler 150 which convert the digital signals generated by the encoders into digital up-down count pulses having repetition rates compatible with the printer 80. The scalers 136, 148 and 150 comprise conventional digital up-down counters (not shown) connected to be responsive to direction sensing circuitry which senses the directions of rotation of X-motor 28, Y-motor 30 and Z-motor 32. A direction sensing circuit of the type mentioned is described in Application Report TRN-104A, Trump-Ross Industrial Controls, Inc., North Billerica, Massachusetts, entitled "The Dual Channel Encoder". Scalers 136, 148 and 150 are operated in a "two" mode which produces two output pulses per every encoder square wave output. The result is to cause the encoder derived data to be scaled by a factor of 2:1; this scale factor may also be set at 1:1 if necessary.

The output of X-scaler 136 is supplied to (1) an X-display 140 (see also FIG. 7a) which indicates to the operator the X-position of the optical reference signal, and (2) an X-digitizer 142 which digitally encodes the output of the X-scaler. The output of Y-scaler 148 is supplied to Y-display 153 and Y-scan counter and digitizer 144 as well as to profile data formatter 133. Similarly, the output of Z-scaler 150 is connected to Z-display 154 and Z-digitizer 146 as well as to the profile data formatter 133.

Display units 140, 153 and 154 are conventional digital displays comprising up/down digital counters, not shown, and decode/driver display devices. Counter inputs are taken from encoder direction up/down output pulses of the type described in the Trump-Ross publication, supra, and the net counts of the up/down pulses represent the absolute coordinate position which is visually displayed.

X-digitizer 142 and Z-digitizer 146 comprise an up/down counter responsive to conventional encoder direction sensing circuitry, of the type described below in connection with the Y-digitizer 144, incorporated respectively in X-axis encoder 36 and Z-axis encoder 38, and generate the $X_0$ and $Z_0$ profile start coordinates for recording on tape 124.

Figure 10:
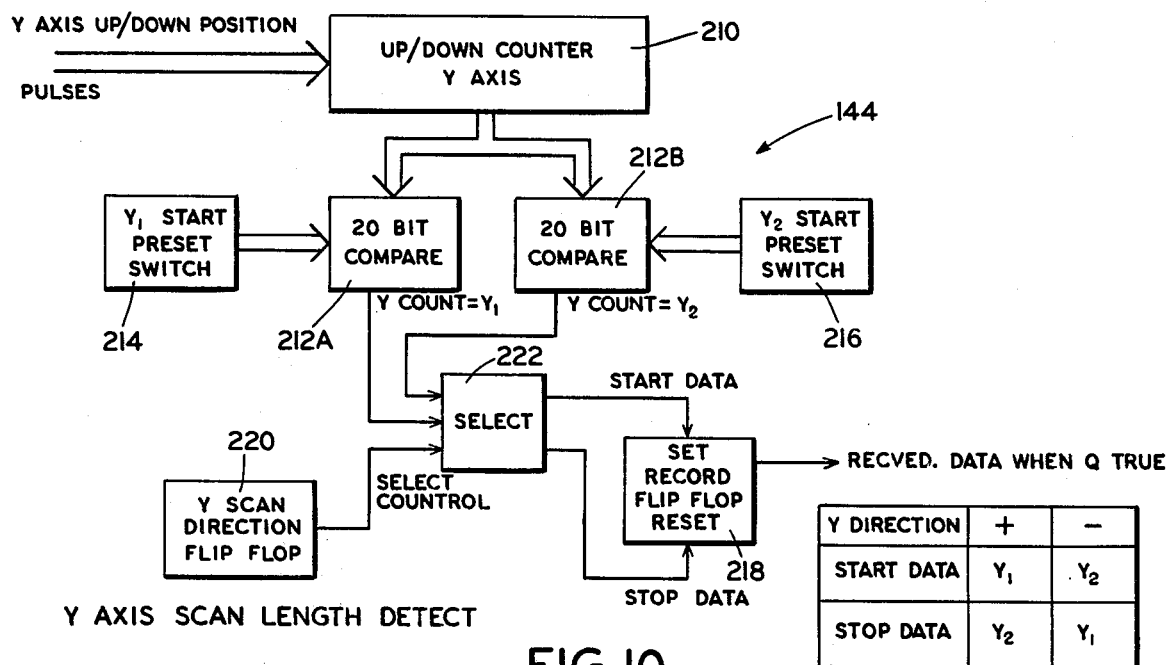

Y-scan counter and digitizer 144, which generates the $Y_0$ start coordinate for recording on magnetic tape 124, also detects the operator preset, Y-scan start and stop coordinates, which define the length of each profile. Referring to FIG. 10, Y-scan counter and digitizer 144 comprises an up/down counter 210 which receives y-axis pulses from Y-axis encoder 36 and Y-scaler 148. The Y-coordinate stored in counter 210 is supplied to comparators 212a and 212b which determine whether the stored Y-coordinate is respectively below a low value $Y_1$, stored in start switch 214, or above a high value $Y_2$, stored in switch 216. The switches 214 and 216 are manually set by the operator. Y-scan direction flip flop 220 controls the output of select switch 222 which transmits the results of the comparisons in comparators 212a and 212b, selectively to the control flip flop 218. If the value of the Y-coordinate stored in counter 210 is determined to be between the values $Y_1$ and $Y_2$, flip flop 218 is set by select switch 222 to logic 1. The output of the flip flop enables Z-axis position encoder 38 to supply signals to Z-axis motor control 158, starts the profile data recording process and turns off Z-brake 162 for recording data on tape 124. On the other hand, when the Y-position coordinate stored in counter 210 is outside the range of coordinates between $Y_1$ and $Y_2$, the flip flop 218 output is reset to logic zero, disabling the Z-position encoder signal generated by encoder 38 and turning on Z-brake 162.

X-motor control 132, which may be an Indexer Model Superior Electric SP 1800-B-5, generates a signal to index or step the X-motor 28 each time a new profile is called for by the profile sequence controller 134. The X-motor control 132 indexes or steps the X-motor 28 by a proper distance in response to a command from profile sequence controller 134 so as to index scanning aperture 88 (FIG. 4) between profiles. The control 132 comprises a pulse generator, not shown, that generates a predetermined number of pulses to the X-motor 28 to step or drive the motor to a predetermined profile or between successive profiles.

Figure 11:
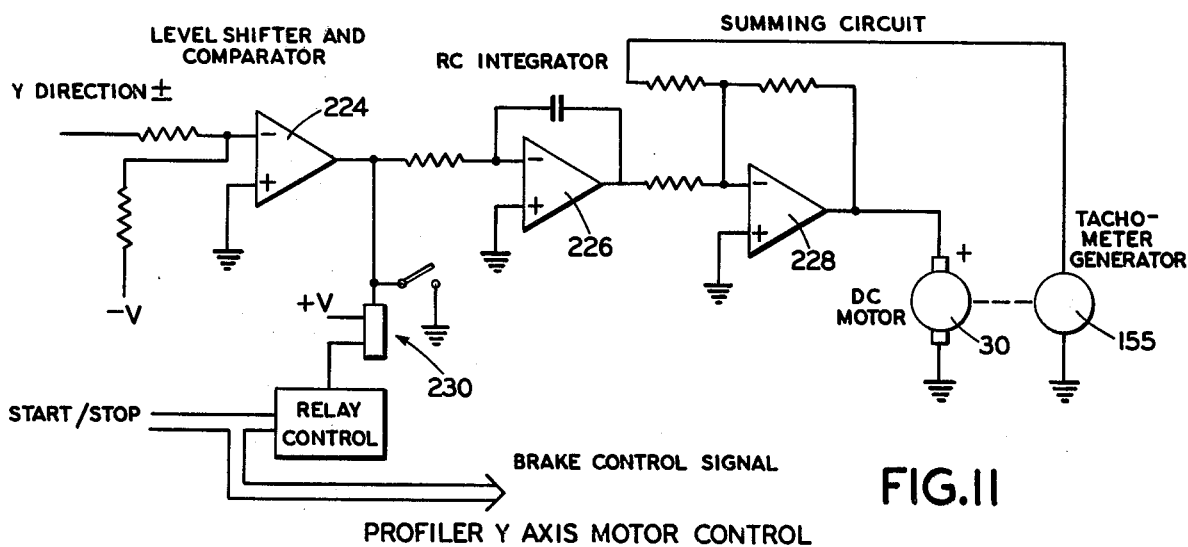

Y-tachometer/generator 155, Y-motor 30 and Y-motor control 152 constitute the Y-axis motor drive system. Tachometer/generator 155 produces a D.C. output voltage proportional to motor shaft rotation speed; the Y-motor 30 being a permanent magnet D.C. motor. Referring to FIG. 11, the Y-motor control 152 comprises a level shifter and comparator 224, an integrator 226 and a summing circuit 228. A (+/−) direction logic signal from profile sequence controller 134 causes rotation of the shaft of Y-motor 30 to reverse depending on the direction signal level. Level shifter and comparator 224 converts this direction signal to a positive or negative signal which is integrated in integrator 226 having a long time constant to produce a gradually increasing or decreasing signal. This gradual increase or decrease produces a smooth motor response to control starting or stopping of D.C. motor 30. The start and stop signals, generated by controller 134, operate relay control circuit 230 to drive the output of comparator 224 to ground when stopping of motor 30 is required. The long time constant of integrator 226 causes Y-scan length overtravel of aperture 88 so that the Y-scan always ends outside of the preset Y-scan start/stop coordinates.

Figure 12:
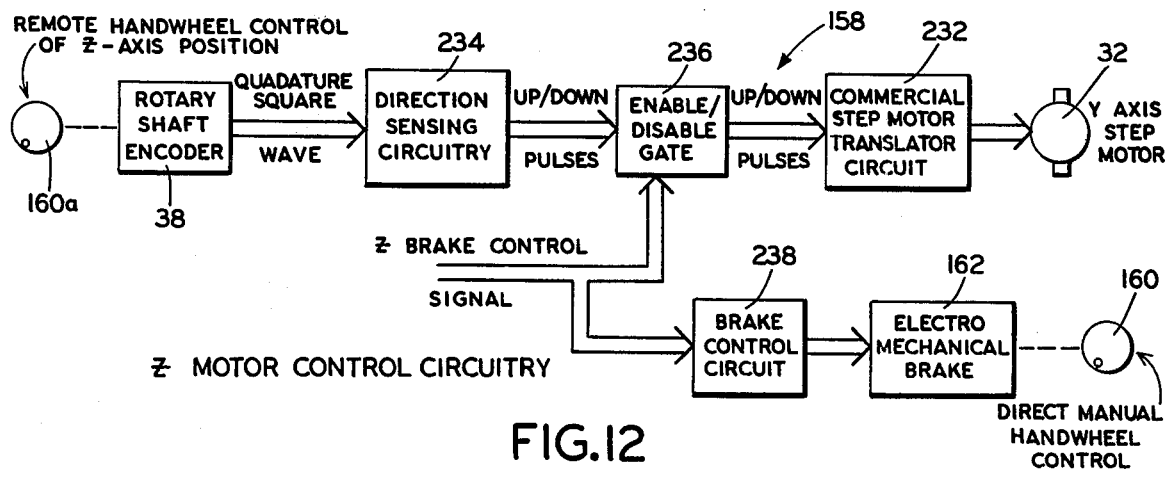

The Z-axis position control system comprises Z-motor 32, the Z-axis encoder 38, Z-motor control 158 and brake 162. Referring to FIG. 12, Z-motor control 158 comprises a conventional stepper motor translator circuit 232 connected to the input terminals of Z-motor 32. Up/down pulses are supplied to the translator 232 from conventional direction sensing circuitry 234 via enable/disable gate 236. The enable/disable gate 236 receives a Z-brake control signal generated by controller 134, the control signal also being supplied to brake control circuit 238 for operating Z-brake 162.

Direction sensing circuitry 234 is of the type described in the Trump-Ross Application Report, supra. The start/stop signal from sequence controller 134 inhibits the position encoder up/down pulses when operation is stopped between adjacent profile generation, and thus locks aperture 88 against Z-coordinate motion called for by handwheel control 160. This same signal also stops the Y-drive, as discussed above. Thus, profile elevation at the end of each profile is mechanically constrained to be identical to the start elevation of the immediately succeeding profile. As a result, recorded profile incremental data may be verified and checked for accuracy by using programs that calculate the recorded incremental profile end elevation data and compare the same with the next profile start elevation. Furthermore, this elevation constraint between adjacent profiles can be used to check profile printer 80 operation since the visual position read out digitizer value at the end of one profile should equal the next profile start elevation; if not, there is a malfunction.

Profile sequence controller 134 automatically controls the operation of profile recorder 20 by monitoring inputs from various control elements shown in FIG. 8, and from front panel controls, and making decisions based on said inputs. Sequence controller 134 also supplies outputs to profile counter and display 125 (see also FIG. 7a) which counts the profiles during scanning of the model, and displays the result to the operator. Sequencer 134 is implemented as a random logic sequencer, in a manner shown in the TTL Applications Handbook, Fairchild Semiconductor, Mountainview, California, August, 1973. Although a profile sequence controller 134 of the type using firmware is preferred, it is to be understood that the controller could, if desired, be implemented by a software controlled system.

Figure 13:
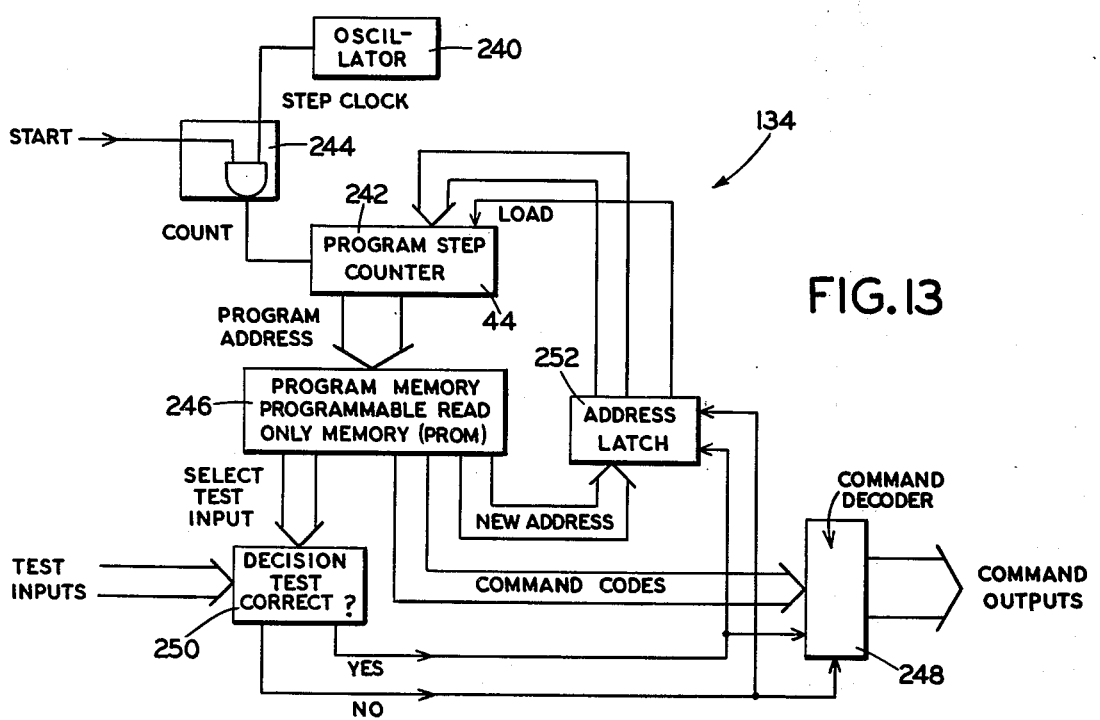

Referring to FIG. 13, controller 134 comprises an oscillator 240 for supplying a timing signal to a program step counter 242 through a gate 244. The output of program step counter 242 is used to control sequencing of program memory 246, which is a programmable read only memory (PROM) containing stored logic sequences that are generated as command outputs through a command decoder 248. Each program step either causes a command to be outputed at decoder 248, or an input condition to be tested at a logic circuit 250. A jump to new address is executed by loading the new address into an address latch 252 and then, depending on the result of the input test in block 250, the new address may be loaded into the program step counter 242.

Each profile scanned by the optical reference point on the model is processed by profile data formatter 133 into a data block comprising a mode profile number, profile start coordinates $(X_0, Y_0, Z_0)$, incremental data $(X, Y, Z)$, and end of profile, represented in FIG. 8b. The profile number is a number assigned to each successive profile or scan line making up the model and is generated by the profile number counter and display 125. Since scanning of the model is made in a zig-zag fashion, the start coordinates for immediately successive profiles are located on opposite profile ends.

Referring to FIG. 8b, the portion of the data block identified as Z-data, contains incremental data representative of the change in the Z-coordinate (elevation) at successive Y-coordinates taken along a scan line on a constant X-coordinate. Since the Z-data is incremental rather than absolute, the Z-data must be referenced to the starting coordinate on each profile. The Z-data are encoded in four-bit binary code, wherein each four-bit character represents an increment having a different positive or negative magnitude in the Z-direction, the maximum magnitude being 7, as shown in the table below.

| Z Action X | Binary Code | Z Action | Binary Code |
| --- | --- | --- | --- |
| Invalid Code | 0000 | −7 steps | 1000 |
| +1 step | 0001 | −6 steps | 1001 |
| +2 steps | 0010 | −5 steps | 1010 |
| +3 steps | 0011 | −4 steps | 1011 |
| +4 steps | 0100 | −3 steps | 1100 |
| +5 steps | 0101 | −2 steps | 1101 |
| +6 steps | 0110 | −1 step | 1110 |

-continued

| Z Action X | Binary Code | Z Action | Binary Code |
|---|---|---|---|
| +7 steps | 0111 | 0 (No Z-change) | 1111 |

The Z-sense data indicates whether any error in elevation has occurred during scanning of each profile. As described more fully below, elevation error is related to excessive slope in elevation called for by the operator. The excessive slope is indicative of possible operator error, and in any event is beyond the data encoded capability of the four-bit code.

Thus, each scan line is characterized by a mode datum, a binary code representing a profile number, and a binary set of characters representing profile start coordinates $(X_0, Y_0, Z_0)$, a binary set of characters corresponding to the successive incremental changes in elevation along the scan line and a code representing end of profile.

Each profile can be recorded independently of the remaining profiles of an orthophotograph, whereby any errors occurring during scanning of one profile are not carried to the next profile. Even if several errors in Z-data are extant in a profile, the succeeding profile is initiated at a location identified by the profile start coordinates so that the Z-data or profile errors do not accumulate.

Profile data formatter 133 is under control of sequence controller 134 and Y-scan counter and digitizer 144 receives data from the X, Y and Z digitizers 142, 144 and 146 from the profile number counter 125 and from X and Z scalers 148 and 150, and outputs data to profile buffer 163 as well as control signals to the profile sequence controller 134.

Figure 14A:
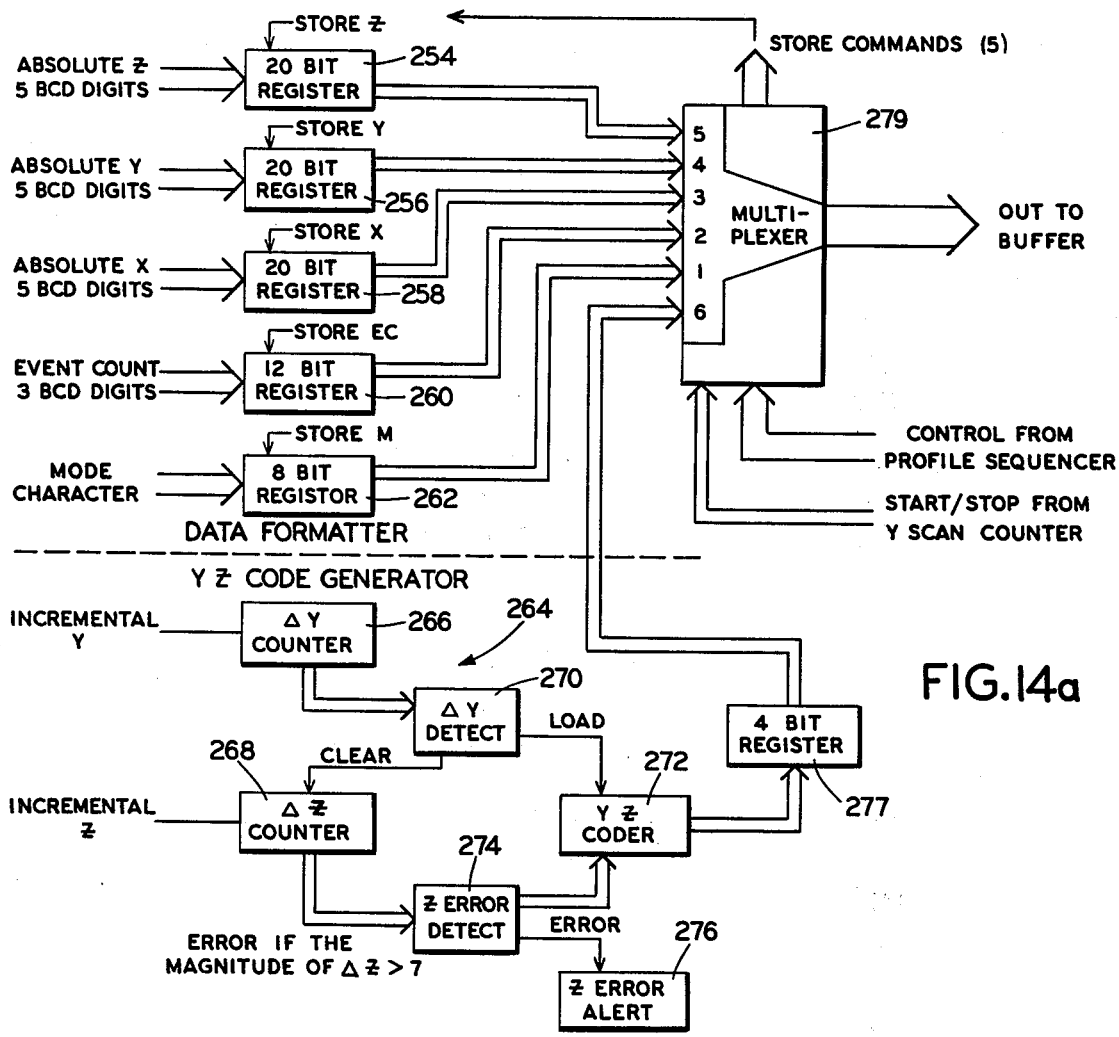

Referring to FIGS. 14a and 14b, data formatter 133 is formed of two functional groups. The first group, or data formatter (see FIG. 14a), arranges the data required for recording on tape 124, and stores the data in profile buffer 163, shown in FIG. 8a. As described above, each profile is formatted in the following manner: (1) mode, (2) profile number, (3) start coordinate, (4) incremental Z-elevation data for each Y-digitized increment (X,Y,Z), (5) error sense and (6) end of profile.

Y,Z code generator 264 constitutes the second functional group of profile data formatter 133. The Y,Z code generator 264 operates only between start and stop commands, defined as "sample periods", scaled Y-pulses from Y-scaler 148 being used to generate a Y-sample interval to Y-counter 266.

As summarized in FIG. 14b, when the data formatter receives a start command from Y-scan counter 144, the formatter immediately stores the start coordinate in registers 252, 254, 256 and 258, stores the event count (E.C.) in register 260 and stores the mode character in register 262. The data formatter simultaneously turns on Y,Z code generator 264, the output of which, together with the data stored in registers 254-262, is supplied to profile buffer 163. When a stop command is received from the Y-scan counter 144, the data formatter sends a stop character to the buffer 163 and signals the sequence controller 134 that the scan is complete.

The net change in Z-elevation is determined by using scaled Z-pulses from scaler 148 to increment Z-counter 268 in the Y,Z code generator 264. Counter 268 is cleared at the start of each Y-sample interval, as monitored by detector 270, and accumulates counts during the sample interval, representing the net change in Z-elevation. At the end of the sample interval, the Z-value is supplied to Y,Z coder 272, which translates the Z-value into the four bit incremental code and outputs the code to register 277. The code in register 277 in turn is supplied to multiplexer 279 which in turn supplies the code along with the data stored in registers 254-262 to buffer 163. Multiplexer 279 supplies these data and codes to buffer 163 in succession, as shown in FIG. 14b, to formulate the data blocks (FIG. 8b).

The Z/Y slope during each sample interval is continuously monitored. If the net change in Z-elevation is greater than 7 counts, as determined by detector 274, the Z-error counter or alert 276 is incremented. If more than four errors occur during a profile, an error flag is "raised" and the operator is alerted.

Profile data buffer 163 is a conventional shift register buffer memory that stores the data for each individual profile, as the profile is being generated. After the generation of the profile ends, the buffer contents are transferred synchronously to tape transport 122 and formatter 164 following a record command. If a profile is to be repeated due to the flag being raised, the buffer is cleared and new profile data are generated and stored.

Tape transport 122 and formatter 164 are implemented with a Digi-Data Inc. Tape Drive Model 1600 and a Phase Encoded Formatter. The transport 122 and formatter 164 are interfaced to the sequence controller 134 by tape write controller 135. Controller 135 issues the required commands to the transport to execute the commands received from the sequence controller 134 or from the operator.

Tape formatter 164 is implemented as a random logic sequencer similar to the one shown in the TTL Applications Handbook, supra. Formatter 164 uses signals described in the Digi-Data Phase Encoded Formatter Operator's Manual, Section 6, "Interface and Application Summary" and uses standard interfacing techniques.

Tape controller 135 is a conventional tape controller device that controls operation of transport 122 and the read/write heads (not shown) thereof in response to signals generated by sequence controller 134. Tape controller 135 controls the following functions: start, stop, write, rewrite. Since controller 135 is conventional, no further description is included herein for brevity.

PROFILE PRINTER CONTROL

Figure 9:
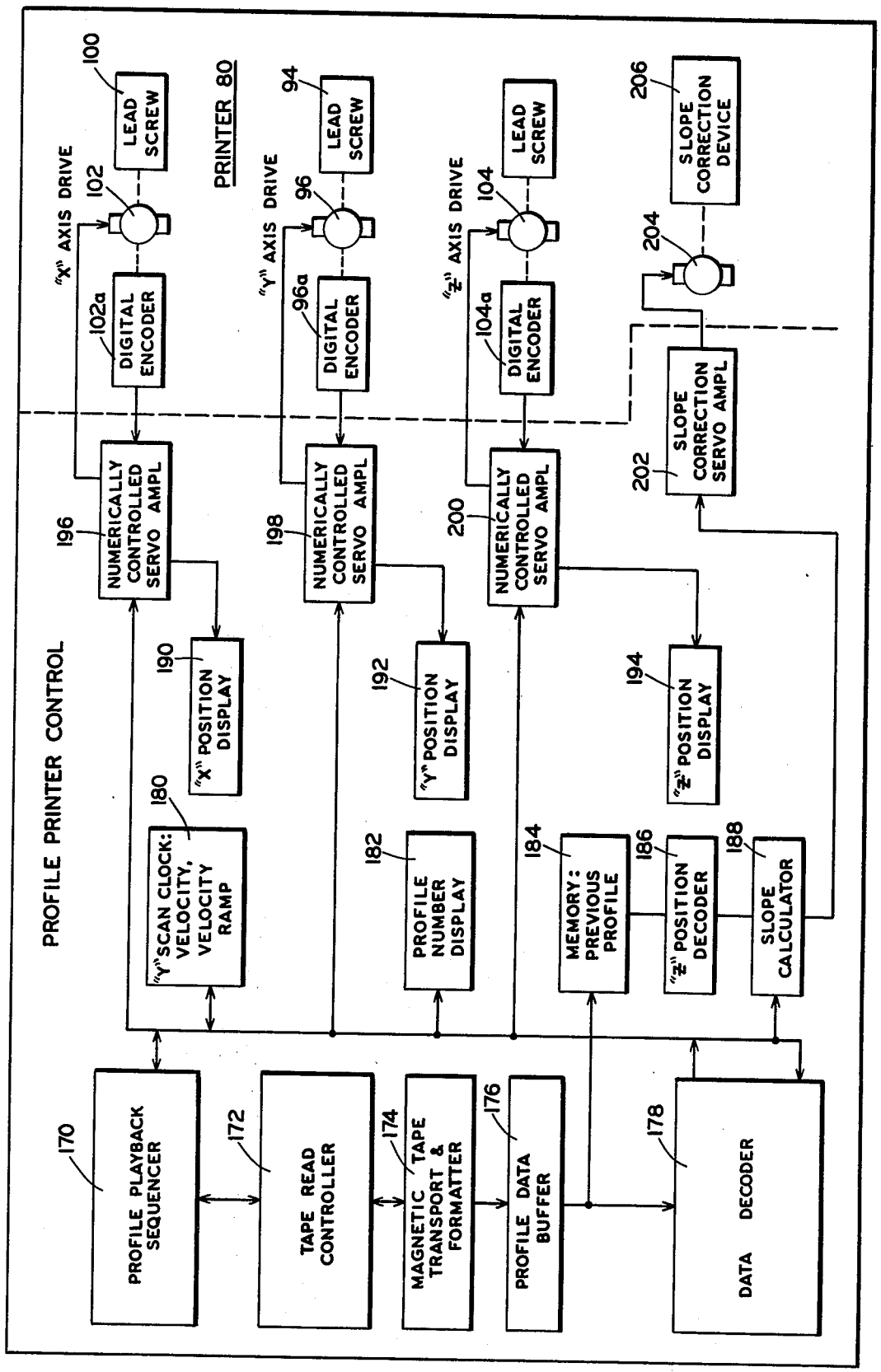
Figure 15A:
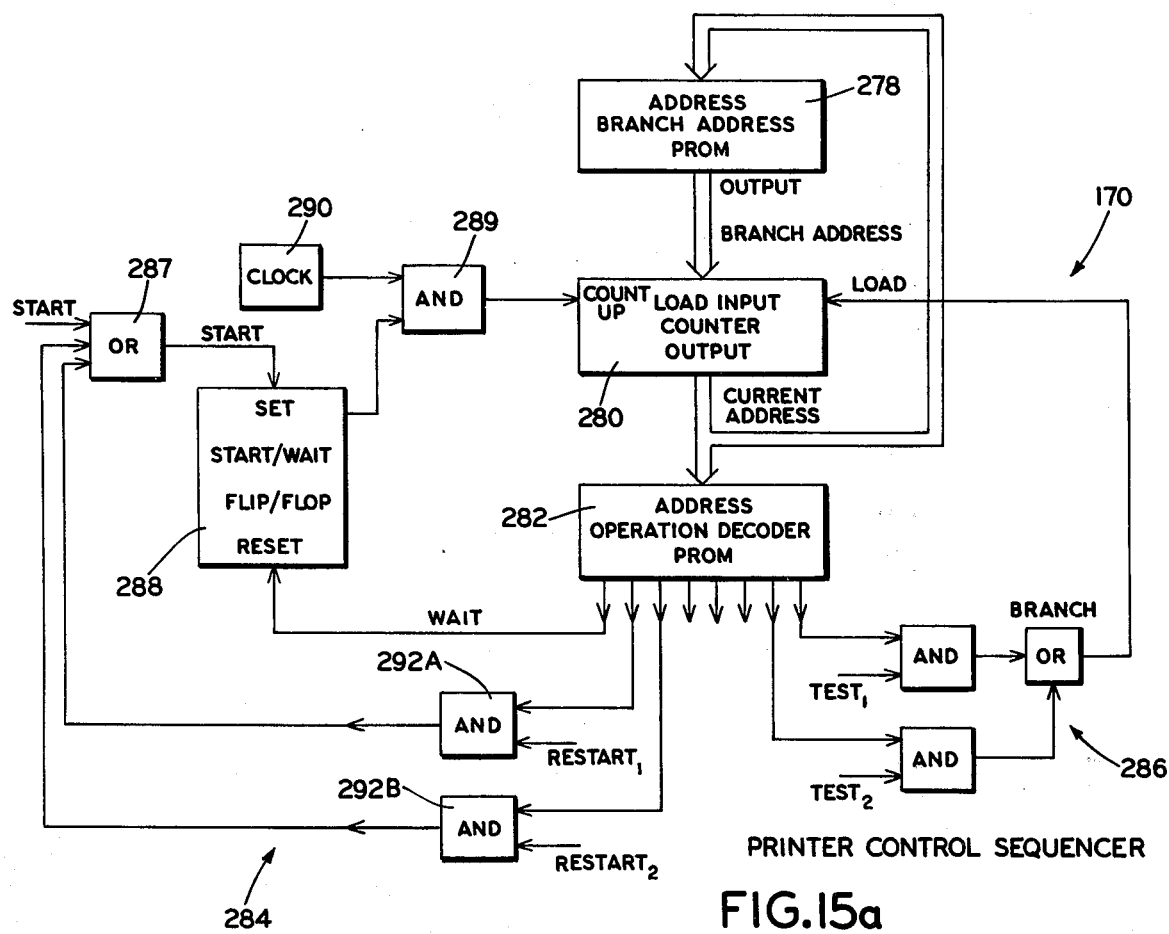
FIG. 15a is a circuit diagram of profile playback sequencer 170, shown in FIG. 9.
Figure 15B:
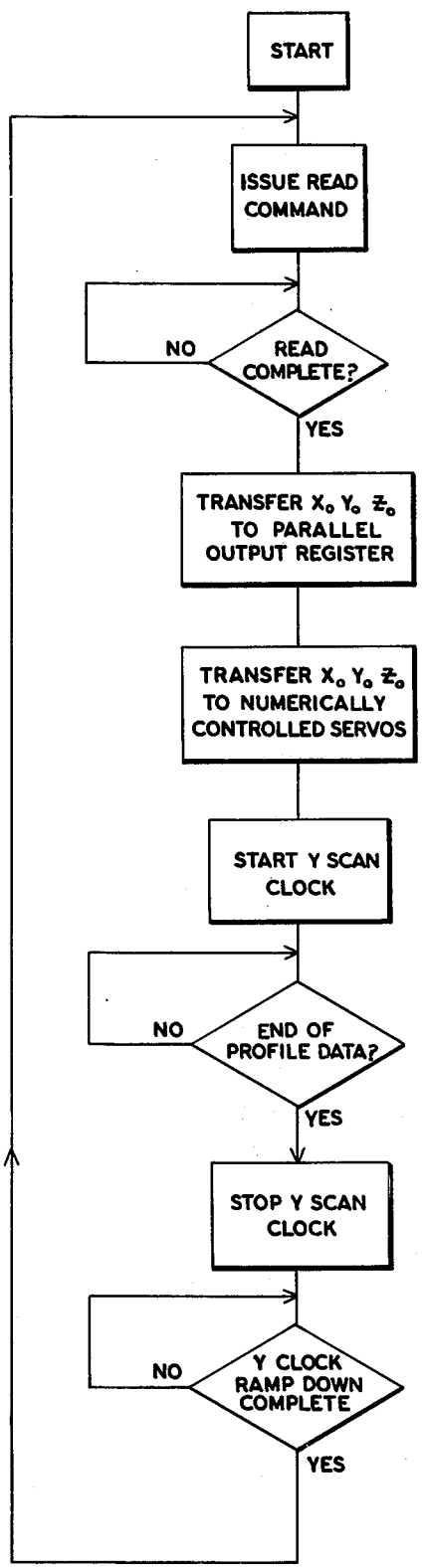

Referring to FIG. 9, profile playback sequencer 170 controls the overall operation of printer 80, as summarized by the signal flow chart in FIG. 15b. The sequencer 170 generates control signals that cause data of one profile to be read from tape 124 and stored in profile data buffer 176. Sequencer 170 initiates reading of one profile from tape 124 under control of a tape read controller 172, and then goes into a "wait for restart" state until the tape is read and the profile data transferred to the buffer 176. After restarting, the sequencer 170 causes the transfer of profile start coordinates from the profile data buffer 176 to a serial in-parallel out register described below, to be supplied to X, Y and Z servo drives 196, 198 and 200. The printer 80 is automatically positioned to these absolute coordinates. Sequencer 170 now starts a Y-scan velocity block 180 and enters a "wait for restart" mode that is restarted by the end of profile data character 0000. This is detected by conventional logic circuitry. Next, sequencer 170 causes another profile to be read and the profile print sequence repeats.

Sequencer 170 is a conventional, hardware programmed sequenced generator, similar to profile sequence controller 134, supra, having wait states and test and branch capability. Referring to FIG. 15a, sequence controller 170 comprises a branch address programmable read only memory (PROM) 278, the output of which is supplied to counter 280. The output of counter 280, which represents a current address, is supplied to operation decoder PROM 282. Outputs from PROM 282 are supplied to (1) the count up input terminal of counter 280 through logic circuitry 284 and (2) the load command terminal of the counter through logic circuitry 286.

An operator start signal sets run/wait flip flop 288, which constitutes a portion of logic circuitry 284, and causes counter 280 to begin counting clock pulses generated by clock 280. Signal flow between clock 290 and counter 280 is controlled by the flip flop 288 via AND gate 289. The output of counter 280 becomes the input address to a PROM 278 which contains the branch address that is loaded into (1) counter 280 when a test and branch condition is met, and (2) PROM 282 which is used as an operation decoder to generate the particular sequence step control levels needed. Output lines from PROM 282 enable restart gates 292a, 292b to set the output of flip flop 288 to logic 1 in response to a start signal through OR gate 287, depending upon the particular step that sequencer 170 is in. The output of PROM 22 is used to control tape controller 172 as well as the remaining elements of profile printer 80, as shown in FIG. 9.

Tape read controller 172 is a hard-wired logic circuit that controls magnetic tape transport and formatter unit 174 to (1) read profile data from magnetic tape 124, (2) detect occurrences of any data errors, (3) re-read profiles as necessary and (4) search the magnetic tape for addressing preselected profiles for selective scanning or editing of the orthophotograph. The operation of controller 172 shall be described in more detail below. Magnetic tape transport and formatter 172 have a construction similar to transport 164 and formatter 164.

Profile data buffer 176 is similar in operation and construction to profile buffer 163, shown in FIG. 8a. The purpose of buffer 176 is to store each profile, read from magnetic tape 124, for comparison with a successive profile in order to determine slope errors and to generate slope error correction signals. The output of profile data buffer 176 is supplied to data decoder 178 which separates the profile data shown in FIG. 8b into the individual data components thereof.

Figure 16:
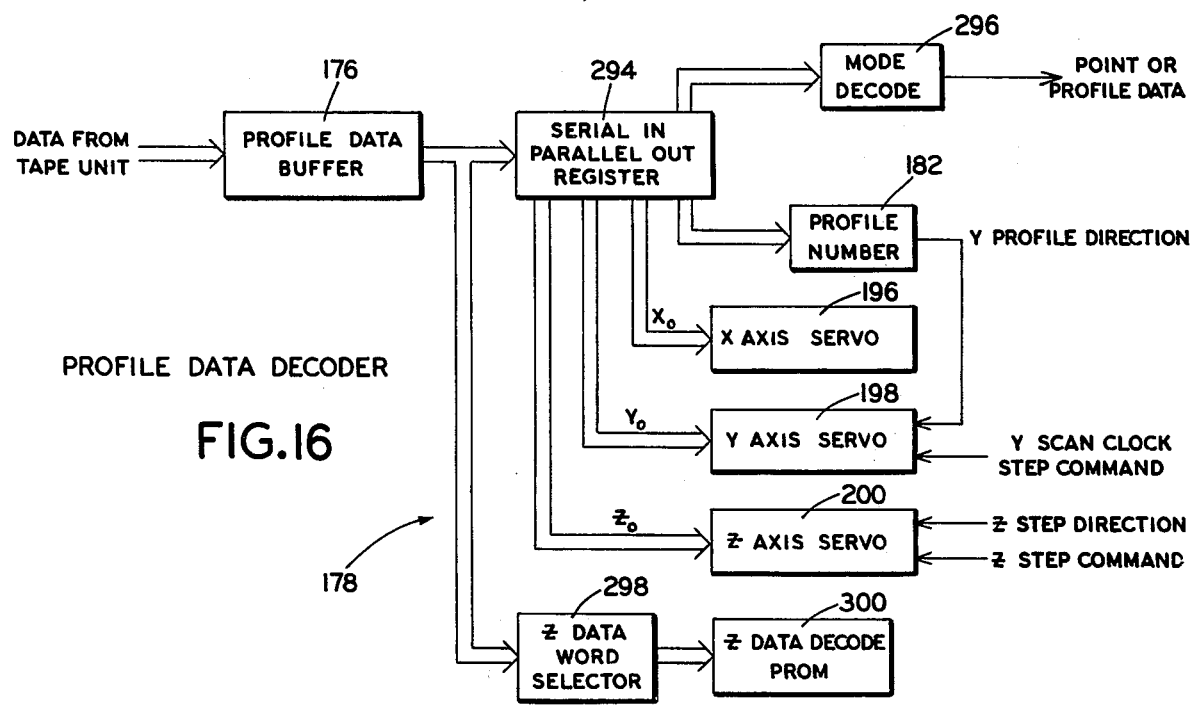
FIG. 16 is a circuit diagram of profile data decoder 178, shown in FIG. 9b.

Referring to FIG. 16, profile data decoder 178 comprises a serial in-parallel out register 294 having outputs connected, respectively, to X-axis servo 196, Y-axis servo 198 and Z-axis servo 200, profile number display unit 182 and mode detector 296. Outputs are tapped from register 294 at appropriate places in order to read out each portion of a data block stored in the register, the portion being supplied to the various servos and other elements, as shown. The decoder 178 also includes a Z-data word selector 298, the output of which is connected to the Z-data decode PROM 300. Y-axis servo 198 and Z-axis servo 200 receive additional inputs respectively from profile number register 182 and Y-step command encoder 96a and from encoder 104a (see FIG. 9).

Sequencer 170 causes the start coordinates to enter the serial in-parallel out register 294 from profile data buffer 176. Also, the profile number is further decoded by unit 182 to determine profile direction.

Y-scan clock 180 is controlled by sequencer 170 to turn on Z-incremental elevation data which are decoded from the magnetic tape 124 and used to position Z-axis servo 200. Each four-bit Z-elevation data word represents the number of steps the Z-axis servo 200 must move corresponding to one Y-step of servo 18, up to a maximum of 7 Z-axis steps. These zero to 7 Z-axis steps are equispaced over the Y-step distance by dividing the Y-step interval into 8 minor steps. PROM 300 is used to decode the Z-elevation data word taken from buffer 176 by selector 298 and to generate an equispaced sequence of Z-steps for each of the 15 elevation code words between zero (+)7 and (−)7, including zero.

Referring to FIG. 17, a circuit 302 for generating the Y,Z step sequence from the decoded Z-elevation data in the manner described above, includes a "times eight" Y-scan clock 304 for generating the 8 minor step intervals for each Y-step, the minor Y-step corresponding to the Z-step. A clock signal is supplied to a modulo 8 counter 305 that drives an eight bit decoder 306. The clock signal thus causes the outputs of decoder 306 to be scanned at the clock signal frequency to develop the minor Y-steps. The first of these minor Y-pulses, generated by decoder 306 at output 1, functions as the Y-motor step command. The remaining seven pulses are used to step the Z-motor 32 by using decoder 306 and AND gate 308 together with OR gate 310 to scan the outputs of Z-data decode PROM 300, in a conventional manner.

Decoder 300 generates a separate output signal for each output count of the Y-scan clock counter 304. For example, a recorded Z-elevation data of (+)7 would cause all seven AND gate inputs at 308 from PROM 300 to be enabled, and seven sequential steps would be generated through OR gate 310 following the first Y-step.

The rate of Y-scan clock 180 is linearly increased or decreased at the scan start and stop points to minimize printer transient effects. Ramps are generated within Y-scan clock 180 whereby the start clock rate gradually increases to the scan rate from a rate sixteen times lower than the scan rate and then gradually decreases to a value sixteen times lower than the scan rate at the end of a scan. Referring to FIG. 18, circuit 312, incorporated within Y-scan clock 180 for generating the required lamp, comprises first and second sixteen bit counters 314 and 316. At the start of a scan, both of the counters 314 and 316 are initialized so that the output of Y-step command clock 318, developed by decoder 306 (FIG. 17), is divided by sixteen in counter 316. Each count generated at the output of counter 316, i.e., a Y-scan clock pulse, is supplied to counter 314 to decrement the contents of this counter, the output of which is loaded into counter 316.

The next fifteen pulses generated by clock 318 is divided by fifteen in counter 316, the output of which again decrements the contents of counter 314. The contents of counter 314 are now generated to counter 316 which divides the next fourteen pulses generated by the clock by fourteen, and so on. The resultant output of counter 316 is a digital ramp that increases from zero pulses to sixteen pulses to be supplied to Y-motor 96.

The Y-scan ramp down sequence at the end of the profile operates in a manner similar to the up sequence, described above. Counter 316 is preset to provide the output of clock 318 by one for clock pulses. Thus, the output of clock 318 is divided by two clock pulses, and so on, until the divisor, provided by counter 316, is sixteen. Finally, the Y-scan clock 318 is stopped. The end points of the ramp are detected by zero and sixteen detectors 320.

As stated above, each profile stored in data buffer 176 is supplied to a previous profile memory 184 to be compared with an immediately successive profile, in order to measure Z/X slope and to generate Z/X slope correction signal to a conventional slope correction device 206. Slope correction device 206 comprises conventional slope correcting optics, such as that disclosed in U.S. Pat. No. 3,450,475 to Mondon, interfaced to an absolute position D.C. servo motor 204 with position feedback. Motor 204 is driven by slope correction servoamplifier 202 which is responsive to the output of slope calculator 188 (FIG. 8a). In general, a D.C. voltage proportional to the Z/X slope between adjacent profiles is obtained by comparing absolute Z-elevation coordinate data at identical Y-axis coordinates of the two profiles. Since the profiles were recorded in zig-zag fashion, one profile must be reversed by storing data in a random access memory (RAM) and addressing the data in a reverse manner; thus, incremental data becomes referenced to the profile end Z-elevation.

Slope calculator 188 determines terrain slope at corresponding Y-coordinates on successive scan lines or profiles. In other words, at each Y-coordinate on a profile at the output of decoder 178, each Z-coordinate (terrain elevation) is compared with the Z-coordinate or elevation on the same Y-coordinate of the immediately preceeding profile. The difference found in Z-coordinate magnitudes or elevations is divided by the distance between profiles in the X-direction, and the resultant is Z/X slope. This calculation is made in slope calculator 188 and the output thereof is supplied to slope correction servo amplifier 202 which operates motor 204 used in connection with the slope correction device.

Referring to FIG. 19a, slope calculation circuit 188 comprises first and second Z-data decoders 322 and 324 supplying elevation step and direction signals, respectively, to counters 326 and 328. Each of the decoders 322 and 324 corresponds to AND gate 308 and OR gate 310 shown in FIG. 17. The input of Z-data decoder 322 is connected to profile buffer memory 176 and the input to decoder 324 is connected to previous profile memory 184. The outputs of counters 326 and 328 are connected to digital-to-analog converter circuits (DACS) 330 and 332 respectively. A coordinate data register 334, of the type shown as 178 in FIG. 16, is connected between profile buffer memory 176 and counter 326.

Figure 19B:
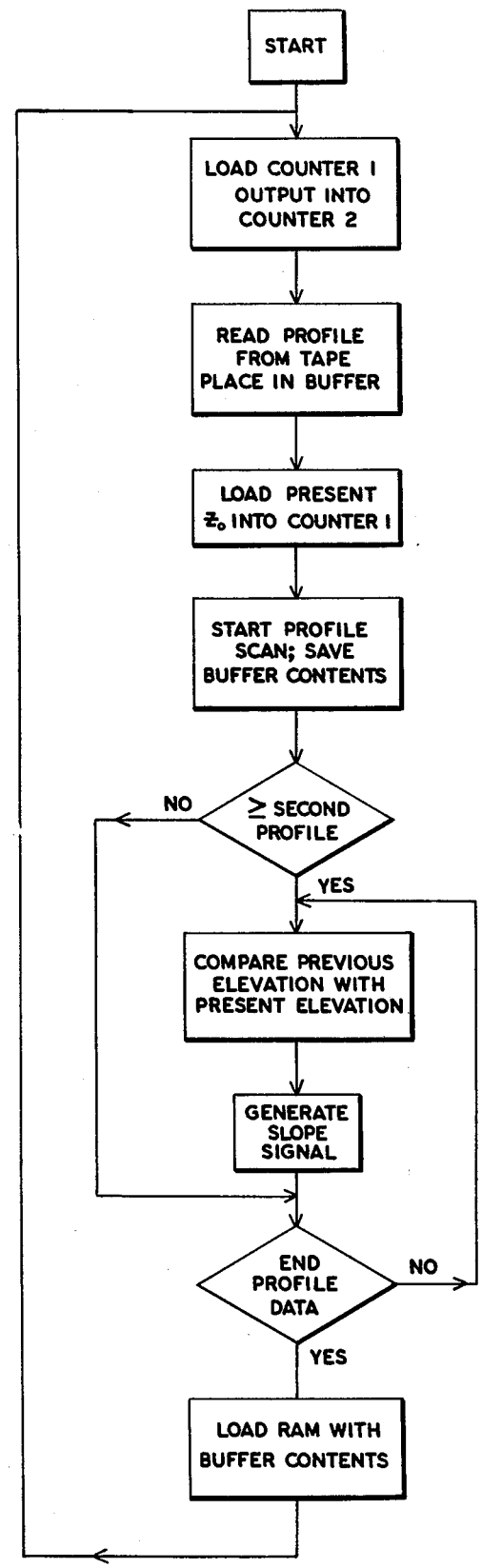

Referring now to FIG. 19b, assuming that a present profile is loaded in profile buffer memory 176 and start elevation coordinate $Z_0$ has been loaded into up/down counter 326 from coordinate data register 332, the profile is reproduced together with the absolute elevation coordinate data output of Z-data decoder 322. At the end of a profile scan, the output of counter 326 represents the present profile end point absolute Z-elevation coordinate. This value is loaded into counter 328 and becomes the start elevation of the previous profile. At the same time, the contents of buffer 176, which are the incremental Z-elevation data that have been stored in a recirculate mode, are transferred to RAM 184 and become previous profile incremental data. Thus, counter 328 and memory 324 contain the previous profile in terms of its end Z-elevation coordinate and other elevation data. These data can be addressed, starting from profile end point, to the memory address counter 336 in a direction opposite to that used when loading the memory 184.

Another profile is then transferred from tape 124 into buffer memory 176 and the start elevation Z thereof is loaded into counter 326. This profile is reproduced or played back and counter 326 is incremented or decremented depending upon the decoded Z increment of data.

The signal proportional to Z/X slope, or ($Z_{present}-Z_{previous}$) is obtained from digital-to-analog converters 330 and 332. The outputs of counters 326 and 328 are converted to analog signals in the converters 330 and 332 which signals are supplied to conventional slope correction device 206 via slope correction servoamplifier 202 and servo motor 204.

Referring to FIG. 20, slope correction servoamplifier 302 comprises an operational amplifier inverter which changes the sign of the previous profile elevation analog signal. Present and inverted previous profile elevations are summed in operational amplifier summer 338 to produce a voltage proportional to ($Z_{present}-Z_{previous}$). This voltage controls the conventional slope correction optics 206 through the D.C. motor position servo 204. Servo 204 is a conventional potentiometer follower D.C. motor having a motor shaft rotation proportional to the servo input voltage thereof.

In summary, the new control system shown in FIGS. 8a and 9 and described in detail above provides production of one or a large number of orthophotographs using any of a variety of non-dedicated instruments, such as the ones shown in FIGS. 1-6, in an off-line mode. The manner of formatting profile data into individual data blocks, as described hereinabove, results in storage of individual profiles on magnetic tape to provide a two-fold advantage: (1) errors that occur in the profiles are not cumulative; and (2) individual profiles may be edited during reproduction. In addition, the control causes terrain slope to be monitored during profile recording in order to detect operator error, and during printing in order to generate slope correction signals, assuring high quality orthophotographs.

In this disclosure there is shown and described only the preferred embodiment of the invention but, as aforementioned, the invention is capable of use in other and different environments and is capable of changes or modifications within the scope of the inventive concept as expressed herein.

What is claimed is:

1. A system for producing orthophotographs, comprising:
    a recording device including a pair of projectors adapted to project a pair of stereoscopically related transparencies; an imaging surface spaced from said projectors; means for processing said projected transparencies so as to form on said imaging surface a stereoscopic image which is a stereomodel of a terrain; means for forming an optical reference point to be maintained on an apparent ground plane of said imaging surface; means for moving said optical reference in X- and Y-directions parallel to said imaging surface; means for further moving said imaging surface in a Z-direction orthogonal to said X- and Y-directions so as to maintain said optical reference on the apparent ground surface on said stereo model during scanning; and means for encoding X- and Y-positions of said optical reference and for encoding Z-positions on said imaging surface during scanning including means for generating digital signals representing said encoded positions;

a reproducing device including a light projector; a platen spaced apart from said projector and carrying a photosensitive sheet; a transparency mount between said projector and said platen for supporting a transparency corresponding to said stereoscopic image; a screen having an aperture formed therein adjacent said platen and in view of said transparency mount; first means for moving said aperture in X- and Y-directions parallel to said platen for scanning said photosensitive sheet; and second means for moving said platen in a Z-direction orthogonal to said X- and Y-directions during scanning; and control means interfacing said recording device and said reproducing device, said control means including means for storing the digital signals representing (X, Y, Z) positions generated by said recording device during scanning; means for processing said encoded signals for compatability with said reproducing device; means for monitoring Y/Z slope of the terrain during scanning thereof by said reference, and means for generating a flag signal in response to an occurrence of an excessive Y/Z slope; and means responsive to said processed data for controlling said first and second moving means of said reproducing device during exposure of said photosensitive sheet.

2. The system of claim 1, including means for storing said flag signals, and alarm means operated in response to a generation of a predetermined number of flag signals.

3. The system of claim 2, including means for displaying a scan line number identifying each Y-direction scan of said stereoscopic image, said storing means further storing said scan line numbers in corresponding data blocks.

4. A system for producing orthophotographs, comprising:

a recording device including a pair of projectors adapted to project a pair of stereoscopically related transparencies; an imaging surface spaced from said projectors; means for processing said projected transparencies so as to form on said imaging surface a stereoscopic image which is a stereomodel of a terrain; means for forming an optical reference point to be maintained on an apparent ground plane of said imaging surface; means for moving said optical reference in X- and Y-directions parallel to said imaging surface; means for further moving said imaging surface in a Z-direction orthogonal to said X- and Y-directions so as to maintain said optical reference on the apparent ground surface on said stereo models during scanning; and means for encoding X- and Y-positions of said optical reference and for encoding Z-positions on said imaging surface during scanning including means for generating digital signals representing said encoded positions;

a reproducing device including a light projector; a platen spaced apart from said projector and carrying a photosenstive sheet; a transparency mount between said projector and said platen for supporting a transparency corresponding to said stereoscopic image; a screen having an aperture formed therein adjacent said platen and in view of said transparency mount; first means for moving said aperture in X- and Y-directions parallel to said platen for scanning said photosensitive sheet; and second means for moving said platen in a Z-direction orthogonal to said X- and Y-directions during scanning; and control means interfacing said recording device and said reproducing device, said control means including means for storing the digital signals representing (X, Y, Z) positions generated by said recording device during scanning; means for processing said encoded signals for compatability with said reproducing device; means for monitoring a X/Z slope of the terrain during playback thereof by said printer, and means responsive to said monitoring means for generating a slope correction signal; and means responsive to said processed data for controlling said first and second moving means of said reproducing device during exposure of said photosensitive sheet.

5. The system of claim 4, wherein said storing means includes means for storing signals representing each scanned line of said stereoscopic image as a single data block and further includes means for storing a set of ($X_0$, $Y_0$, $Z_0$) coordinate data representing a starting point for each line scan, and incremental data indicating a change in Z-position for each successive Y-position during a line scan, said starting coordinate data and said incremental data being included in said data block.

6. The system of claim 5, wherein said processing means includes encoded signal repetition means for providing magnitude scaling of said starting coordinates and incremental data for said compatability.

7. The system of claim 4, wherein said X/Z slope monitoring means includes first buffer storage means for storing previous profile data reproduced by said printer, and circuit means for comparing Z-coordinate elevation data at corresponding Y-coordinates of present profile data and said previous, stored profile data to determine slope.

8. A method of producing orthophotographs from a pair of stereoscopically related transparencies, comprising in the steps of projecting a three dimensional image of a terrain model related to said transparencies on a imaging surface; causing an optical reference to scan said surface in zig-zag fashion; controlling the distance between said optical reference and said imaging surface during scanning to maintain said reference in intersection with an apparent ground surface of said terrain image to define terrain profiles; digitally encoding X- and Y-coordinates parallel to said imaging surface of said optical reference during scanning; further digitally encoding Z-coordinates orthogonal to said imaging surface of said optical reference; monitoring Y/Z slope of each of said profiles during scanning of said imaging surface; detecting each occurrence of an excessive Y/Z slope; counting each of said occurrences; providing an indication of a predetermined number of detected occurrences; formatting the digitally encoded X, Y and Z coordinates into an individual data block for each terrain profile; recording said data blocks on a storage means; and reading out said stored data blocks to control scanning of a photosensitive sheet during exposure of said sheet to one of said transparencies in an orthophotographic printer.

9. A method of producing orthophotographs from a pair of stereoscopically related transparencies, comprising the steps of projecting a three dimensional image of a terrain model related to said transparencies on an imaging surface; causing an optical reference to scan said surface in zig-zag fashion; controlling the distance between said optical reference and said imaging surface during scanning to maintain said reference in intersection with an apparent ground surface of said terrain image to define terrain profiles; digitally encoding X- and Y-coordinates parallel to said imaging surface of said optical reference during scanning; further digitally encoding Z-coordinates orthogonal to said imaging surface of said optical reference; monitoring X/Z slope during reading out of said stored data blocks; generating slope correction signals for use with slope correction optics; formatting the digitally encoded X, Y, and Z coordinates into an individual data block for each terrain profile; recording said data blocks on a storage means; and reading out said stored data blocks to control scanning of a photosensitive sheet during exposure of said sheet to one of said transparencies in an orthophotographic printer.

10. The method of claim 9, wherein the step of monitoring includes the steps of storing each data block representing a present profile in a first buffer, storing each data block representing a previous profile in a second buffer, comparing Z-elevation coordinates at a common X-coordinate to determine an elevation difference between successive profiles, and deriving X/Z slope from said elevation difference.

* * * * *